United States Patent

Motohira

(10) Patent No.: US 11,420,526 B2
(45) Date of Patent: Aug. 23, 2022

(54) CHARGE CONTROLLER, CHARGING SYSTEM, AND VEHICLE

(71) Applicant: Toyota Jidosha Kabushiki Kaisha, Toyota (JP)

(72) Inventor: Akito Motohira, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 376 days.

(21) Appl. No.: 16/661,573

(22) Filed: Oct. 23, 2019

(65) Prior Publication Data

US 2020/0130522 A1 Apr. 30, 2020

(30) Foreign Application Priority Data

Oct. 26, 2018 (JP) .............................. JP2018-201937

(51) Int. Cl.
*B60L 53/22* (2019.01)
*B60L 3/00* (2019.01)
*B60L 15/00* (2006.01)

(52) U.S. Cl.
CPC ............. *B60L 53/22* (2019.02); *B60L 3/0069* (2013.01); *B60L 3/0084* (2013.01); *B60L 3/0092* (2013.01); *B60L 15/007* (2013.01)

(58) Field of Classification Search
CPC ...... B60L 53/22; B60L 3/0069; B60L 3/0084; B60L 3/0092; B60L 15/007; B60L 3/04; B60L 2240/66; B60L 2240/667; B60L 2240/70; B60L 53/11; B60L 53/00; B60L 53/14; Y02T 10/72; Y02T 90/16; Y02T 10/70; Y02T 10/7072; Y02T 90/12; Y02T 90/14; H02J 7/0029

USPC .......................................................... 320/109
See application file for complete search history.

(56) References Cited

U.S. PATENT DOCUMENTS

2016/0221455 A1   8/2016  Ando et al.
2017/0366024 A1*  12/2017 Chen ..................... G01F 23/263

FOREIGN PATENT DOCUMENTS

| JP | S60-042985 U | 3/1985 |
| JP | 2003-331021 A | 11/2003 |
| JP | 2010-098845 A | 4/2010 |
| JP | 2011-080815 A | 4/2011 |
| JP | 2011-128789 A | 6/2011 |
| JP | 2011-244667 A | 12/2011 |
| JP | 2014-187771 A | 10/2014 |
| JP | 2015-056935 A | 3/2015 |
| JP | 2018-018276 A | 2/2018 |

* cited by examiner

*Primary Examiner* — Paul Dinh
(74) *Attorney, Agent, or Firm* — Dinsmore & Shohl LLP

(57) ABSTRACT

A processor included in a server acquires, by a weather information acquisition unit, weather information related to rainfall in a region where an external charging of a vehicle is performed. The processor also acquires flooding information indicative of prediction of flood damage to the region from a flooding information DB included in a storage device. If the vehicle is determined, based on the acquired weather information and flooding information, as likely to be inundated with water while the vehicle is stationary in the charging station, the processor transmits to the vehicle a stop instruction for stopping the external charging. The vehicle stops the external charging if the vehicle receives the stop instruction for stopping the external charging from the server.

11 Claims, 14 Drawing Sheets

FIG.3
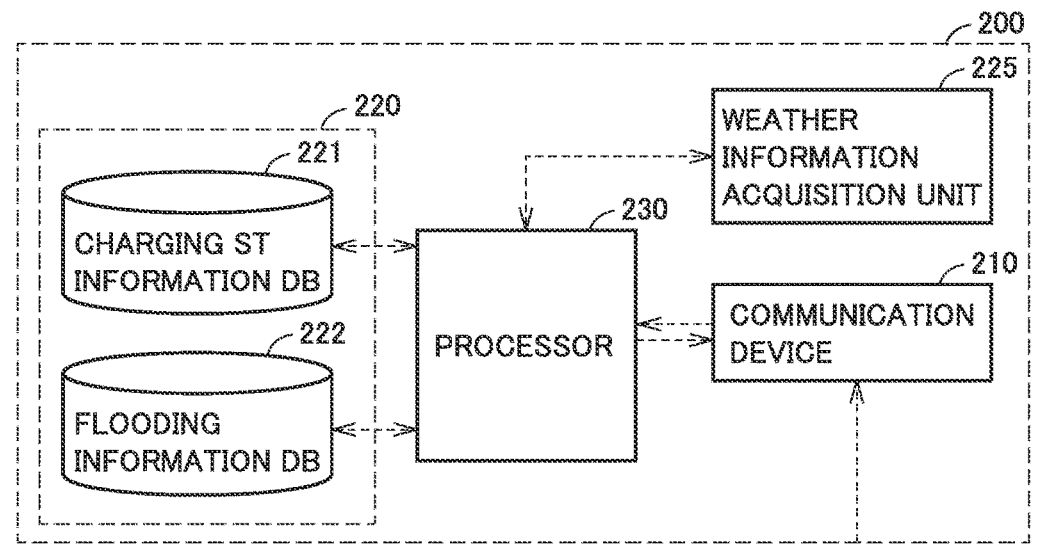
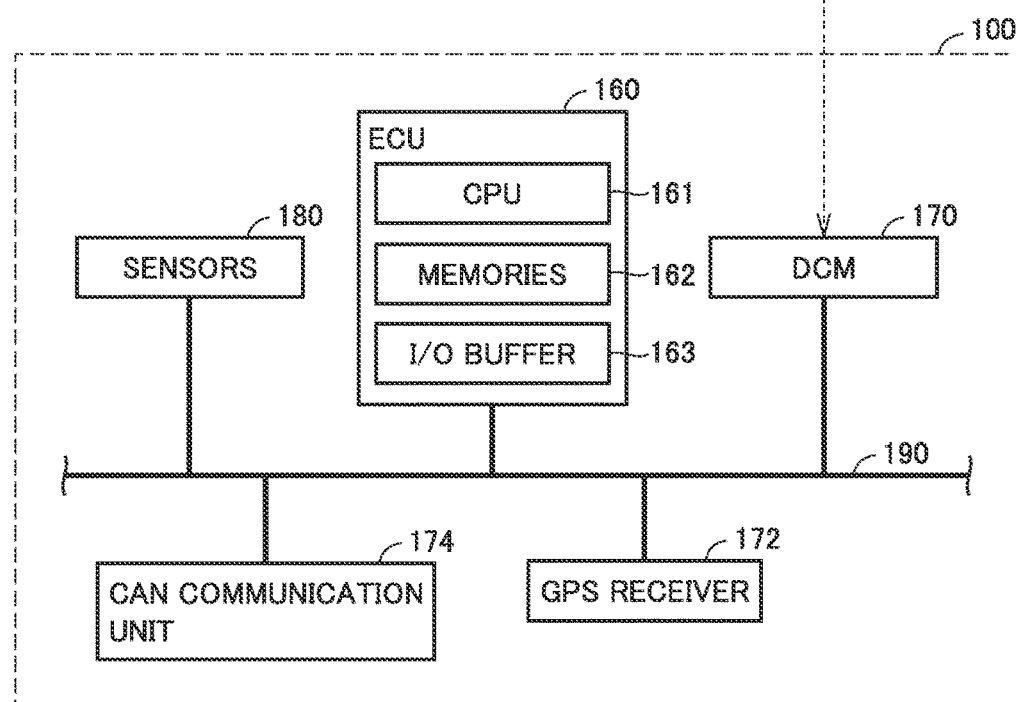

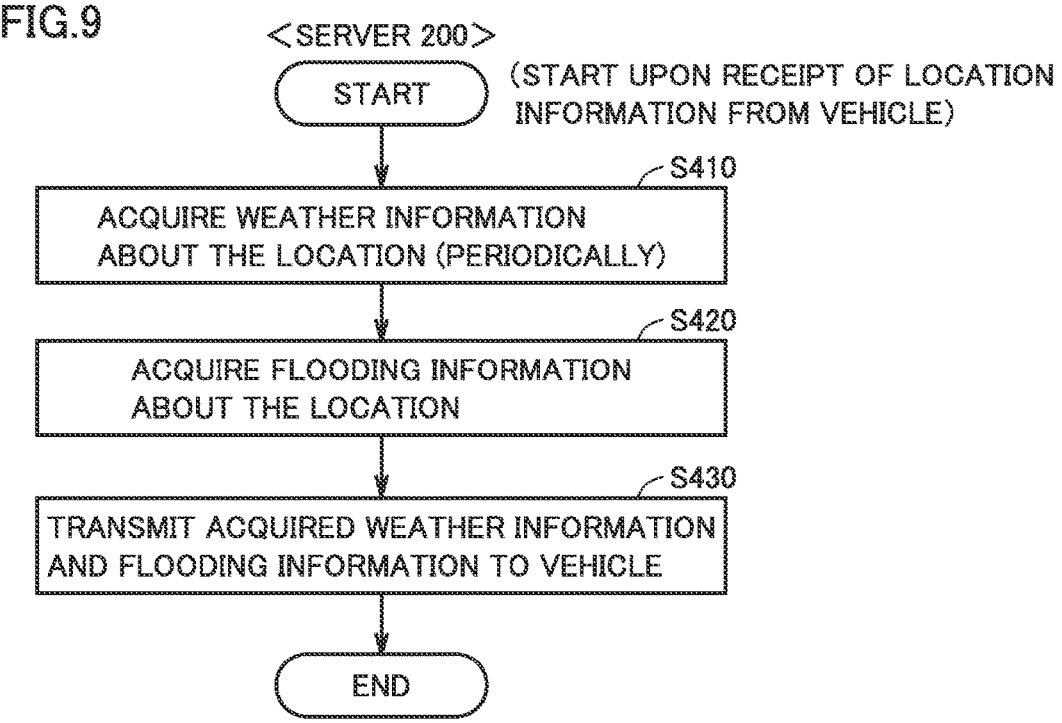
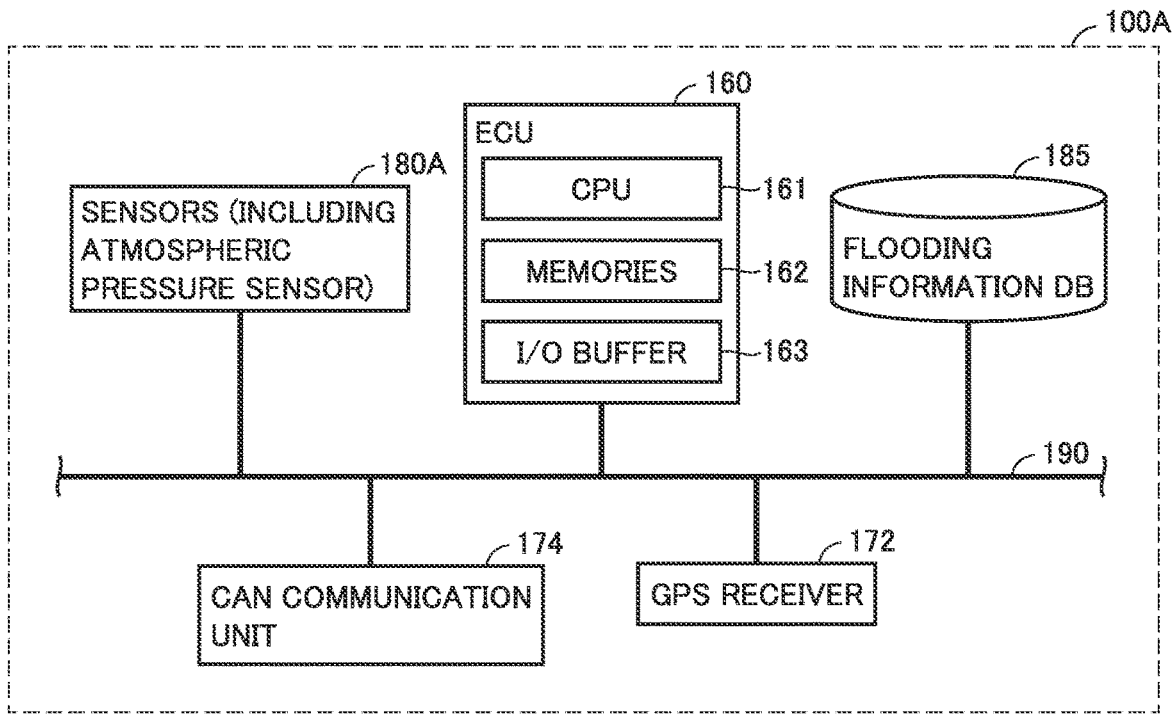

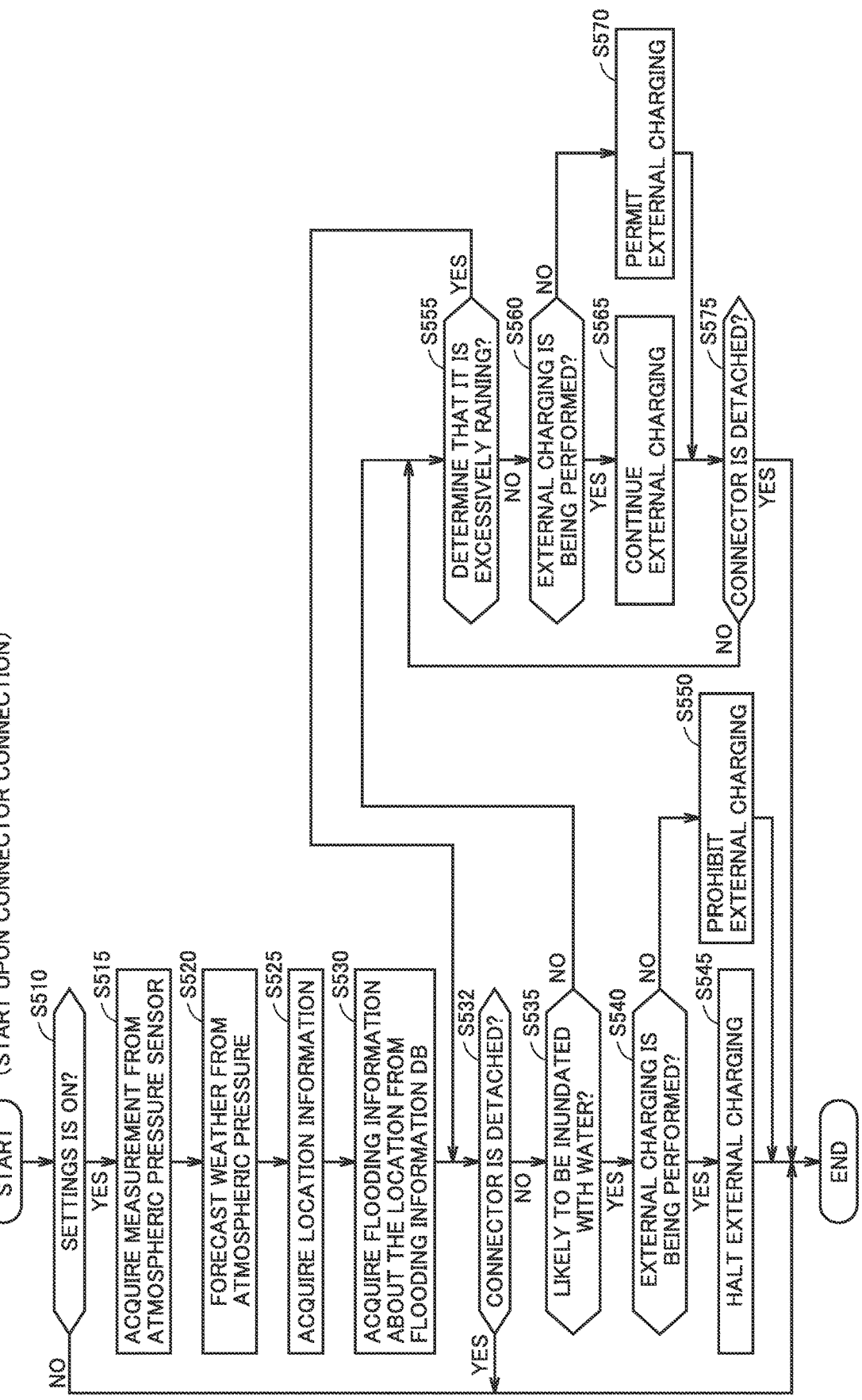

CHARGE CONTROLLER, CHARGING SYSTEM, AND VEHICLE

CROSS REFERENCE TO RELATED APPLICATIONS

This nonprovisional application claims priority to Japanese Patent Application No. 2018-201937 filed on Oct. 26, 2018 with the Japan Patent Office, the entire content of which is hereby incorporated by reference.

BACKGROUND

Field

The present disclosure relates to a charge controller, a charging system, and a vehicle, which are configured to control external charging in which a power storage device included in the vehicle, is charged by a charging facility provided outside the vehicle.

Description of the Background Art

Japanese Patent Laying-Open No. 2015-56935 discloses a charging system which performs external charging in which a power storage device, included in a vehicle, is charged by a charging facility outside the vehicle. The charging system includes a rain sensor for detecting rain. If rain is detected by the rain sensor, a control device at least prohibits quick charging or reduces the amount of charging current in fast charging. This can forestall electrical leak that is caused by a failed charging cable or a wet connection between a connector and an inlet.

In the above charging system, external charging is permitted if the external charging is free of influence of rain itself due to the fact that the external charging is performed in a roofed garage or charging station, etc. However, even if no rain is detected by the rain sensor due to the roof, the vehicle may be inundated with water when heavy rainfall is caused by typhoon or the like, depending on a place (region) where the external charging is performed. In such a case, the external charging cannot be stopped based on the rain information detected by the rain sensor.

SUMMARY

The present disclosure is made to solve the problem, and an object of the present disclosure is to provide a charge controller, a charging system, and a vehicle, which can stop the external charging, as appropriate, under rainfall conditions.

A charge controller according to the present disclosure is configured to control external charging, and includes an information acquisition device and a control device. The information acquisition device is configured to acquire weather information related to rainfall in a region where the external charging is performed, and flooding information indicative of a prediction of flood damage to the region. The control device is configured to stop the external charging when it is determined, based on the weather information and the flooding information acquired by the information acquisition device, that the vehicle is likely to be inundated with water while the vehicle is stationary in the charging facility.

In the charge controller, it is determined whether the vehicle is likely to be inundated with water while the vehicle is stationary in the charging facility, based on the weather information and flooding information about the place (region) where the external charging is performed. This allows the external charging to be stopped if the vehicle may be inundated with water due to excessive rain caused by typhoon or the like, even when no rain is detected by the rain sensor because the place in which the external charging is performed is roofed.

The vehicle may be configured to perform the external charging from the charging facility through a charging cable, and the control device may be configured to determine, when the vehicle and the charging facility are connected to each other by the charging cable, whether the vehicle is likely to be inundated with water.

According to such a configuration, the external charging can be prohibited before it is initiated.

When the weather information indicates rainfall greater than or equal to a predetermined amount, the control device may be configured to determine whether the vehicle is likely to be inundated with water.

According to such a configuration, if rainfall increases during the external charging and the vehicle is determined as likely to be inundated with water, the external charging can be halted.

The control device may determine that the vehicle is likely to be inundated with water when the weather information indicates rainfall greater than or equal to a predetermined amount and the flooding information indicates the prediction of flood damage greater than or equal to a predetermined level.

According to such a configuration, the determination can be made with accuracy as to whether the vehicle is likely to be inundated with water.

In the event the vehicle is determined as likely to be inundated with water during external charging, when the vehicle is performing external charging the control device may halt the external charging, and when the vehicle is not performing external charging the control device may prohibit external charging thereafter.

According to such a configuration, the external charging can be stopped, as appropriate, according to a status of implementation of the external charging.

The weather information includes at least one of rainfall, special warning, river flooding information, and evacuation information, for example.

This allows for determination as to whether it is excessively raining to 3 degree that the vehicle can be inundated with water during external charging, only when it is so excessively raining. Stated differently, the vehicle is less likely to be inundated with wafer during external charging unless it is excessively raining, in which case the external charging can be performed.

The flooding information includes a flooding hazard map indicating the risk of flooding for each region, for example.

Due to this, when it can be seen from the flooding hazard map that flood damage is less likely to occur in the place where the external charging is performed, the vehicle is less likely to be inundated with water even if it is raining excessively during the external charging. Thus, the external charging can be performed.

A charging system according to the present disclosure includes a vehicle configured to perform external charging, and a server configured to communicate with the vehicle. The server is configured to: (1) receive location information of the vehicle from the vehicle, (2) acquire weather information and flooding information, based on the location information, the weather information being related to rainfall in a region where the external charging is performed, the flooding information indicating prediction of flood damage to the region, (3) determine, based on the weather information and the flooding information, whether the vehicle is likely to be inundated with water while the vehicle is stationary in the charging facility, (4) transmit to the vehicle a stop instruction for stopping the external charging, when the vehicle is determined as likely to be inundated with water. The vehicle is configured to stop the external charging when the vehicle receives the stop instruction from the server.

In the charging system, the server acquires the weather information and the flooding information, and determines whether the vehicle is likely to be inundated with water. Consequently, according to the charging system, there is no need to incorporate these features into the vehicle.

Moreover, a charging system according to the present disclosure includes a charging facility which is provided outside the vehicle and configured to supply power for charging a power storage device included in the vehicle, and a server configured to communicate with the charging facility. The server is configured to (1) acquire weather information and flooding information, based on location information of the charging facility, the weather information being related to rainfall in a region where the charging facility is installed, the flooding information indicating prediction of flood damage to the region, (2) determine, based on the weather information and the flooding information, whether the vehicle, which is stationary in the charging facility, is likely to be inundated with water, and (3) transmit to the charging facility a stop instruction for stopping supply of the power to the vehicle when the vehicle is determined as likely to be inundated with water. The charging facility is configured to stop the supply of the power to the vehicle when the charging facility receives the stop instruction from the server.

In the charging system, the server acquires the weather information and the flooding information, and determines whether the vehicle is likely to be inundated with water, and when the vehicle is determined as likely to be inundated with water, the supply of the power to the vehicle from the charging facility is stopped. Consequently, according to the charging system, there is no need to incorporate special features that are related to the above, into the vehicle.

A vehicle according to the present disclosure is configured to perform external charging and includes: a communication device configured to communicate with a server provided outside the vehicle; and a control device configured to control the external charging. The control device is configured to (1) acquire weather information and flooding information from the server, using the communication device, the weather information being related to rainfall in a region where the external charging is performed, the flooding information indicating prediction of flood damage to the region, (2) determine, based on the acquired weather information and flooding information, whether the vehicle is likely to be inundated with water while the vehicle is stationary in the charging facility, and (3) stop the external charging when the vehicle is determined as likely to be inundated with water.

According to the vehicle, determination as to whether the vehicle is likely to be inundated with water can be made based on the weather information and flooding information acquired from the server, and the external charging can be stopped based on a result of the determination.

Moreover, a vehicle according to the present disclosure is configured to perform external charging, and includes: an atmospheric pressure sensor configured to measure atmospheric pressure around the vehicle; a storage device configured to store flooding information indicative of the prediction of flood damage for each region; and a control device configured to control the external charging. The control device is configured to: (1) forecast rain in a place where the external charging is performed, from a measurement by the atmospheric pressure sensor, (2) acquire, from the storage device, the flooding information about the place where the external charging is performed, (3) determine, based on the forecast of rain and the acquired flooding information, whether the vehicle is likely to be inundated with water while the vehicle is stationary in the charging facility, and (4) stop the external charging when the vehicle is determined as likely to be inundated with water.

According to the vehicle, the vehicle by itself (without communicating with a server outside the vehicle) can determine whether the vehicle is likely to be inundated with water, and slop the external charging based on a result of the determination.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram detailing configurations of an ECU included in the vehicle and related devices, and a server.

FIG. 9 is a flowchart showing one example procedure of processes which are performed by a processor included in a server according to Embodiment 2.

FIG. 10 is a diagram detailing configurations of an ECU included in a vehicle according to Embodiment 3 and related devices.

FIG. 11 is a flowchart showing one example procedure of processes which are performed by the ECU included in the vehicle according to Embodiment 3 to perform external charging.

DETAILED DESCRIPTION

Hereinafter, embodiments according to the present disclosure will be described, with reference to the accompanying drawings. Note that the same reference signs are used to refer to the same or like parts and the description thereof will not be repeated.

Embodiment 1

<Configuration of Charging System>

Figure 1:
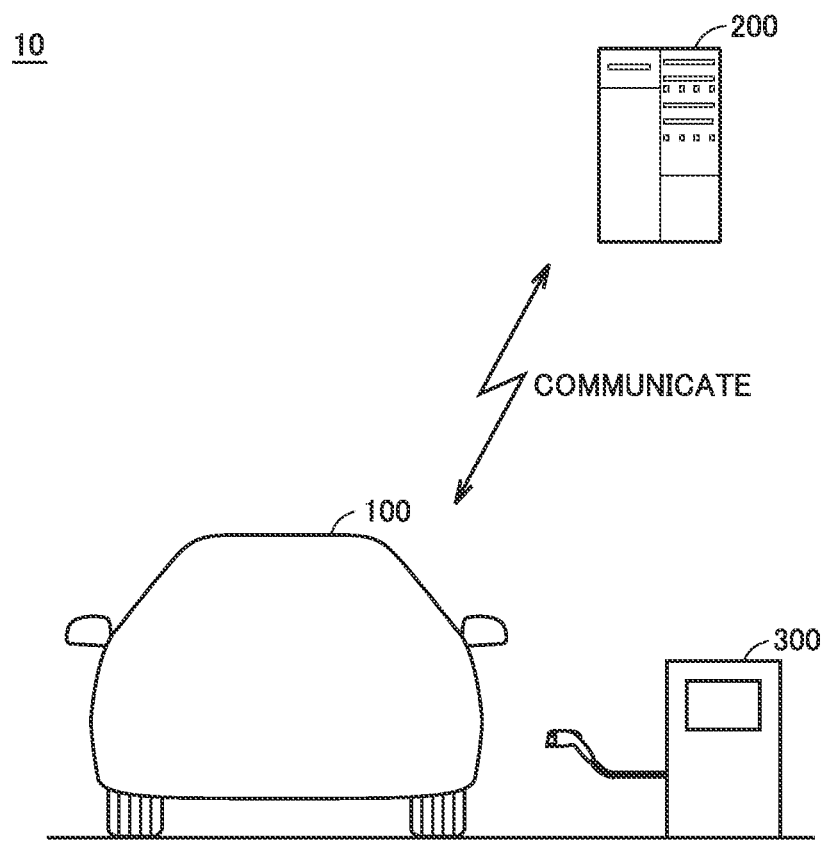
FIG. 1 is a diagram schematically showing an overall configuration of a charging system according to Embodiment 1.

FIG. 1 is a diagram schematically showing an overall configuration of a charging system according to Embodiment 1 of the present disclosure. Referring to FIG. 1, a charging system 10 includes a vehicle 100, a server 200, and a charging station 300. Vehicle 100 and server 200 are configured to communicate with each other via a communication network (not shown) such as the Internet or a telephone line.

Vehicle 100 is, as described below with reference to FIG. 2, an electric vehicle which is equipped with a power storage device and capable of traveling by a motor using power stored in the power storage device. Note that vehicle 100 may be a hybrid vehicle that is additionally equipped with an engine, besides the motor, or may be a fuel cell vehicle that is additionally equipped with a fuel cell, besides the power storage device, etc.

Vehicle 100 is further configured to charge the power storage device, using power supplied from charging station 300. A connector, provided at a tip of a charging cable extending from charging station 300, is connected to an inlet of vehicle 100. As an instruction for performing external charging is given in vehicle 100 or charging station 300, the power storage device in vehicle 100 is charged by charging station 300 through the charging cable.

Server 200 communicates with vehicle 100 through the communication network to receive necessarily information from vehicle 100 and transmit necessarily information to vehicle 100. In Embodiment 1, server 200, which is discussed in more detail below, determines whether vehicle 100 is likely to be inundated with water while vehicle 100 is stationary in charging station 300. When vehicle 100 is likely to be inundated with water, server 200 transmits an external charging stop instruction to vehicle 100. A configuration and operation of server 200 will be described in detail below.

Figure 2:
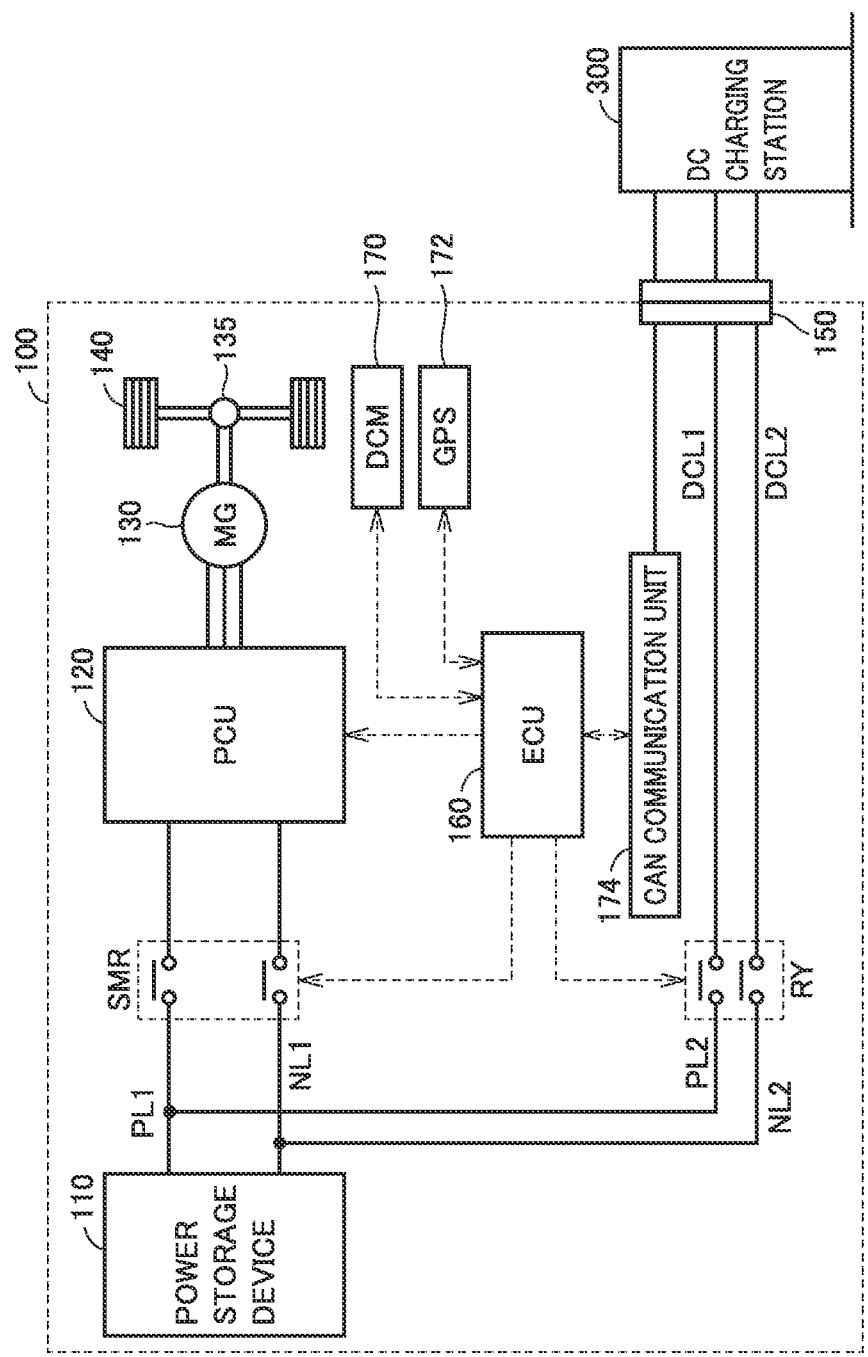
FIG. 2 is a diagram showing one example configuration of a vehicle.

FIG. 2 is a diagram showing one example configuration of vehicle 100. Referring to FIG. 2, vehicle 100 includes a power storage device 110, a system main relay (SMR), a power control unit (hereinafter, referred to as "PCU") 120, a motor generator (hereinafter, referred to as "MG") 130, a mechanical power transmission gear 135, driving wheels 140, an inlet 150, and a charge relay RY. Vehicle 100 further includes an electronic control unit (ECU) 160, a data communication module (DCM) 170, a GPS (Global Positioning System) receiver 172, and a CAN (Controller Area Network) communication unit 174.

Power storage device 110 is a chargeable and dischargeable power storage element. Power storage device 110 includes, for example, a secondary battery, such as a lithium-ion battery or a nickel-metal hydride battery, or a power storage element, such as an electric double layer capacitor. Note that the lithium-ion secondary battery is a secondary battery which contains lithium as a charge carrier, and that the lithium-ion secondary battery can include a general lithium-ion secondary battery whose electrolyte is a liquid, as well as what is known as an all-solid-stale battery using a solid electrolyte.

Power storage device 110 is charged by charging station 300 which is provided outside the vehicle and connected to inlet 150 through the charging cable (external charging). Power storage device 110 supplies power to MG 130 through PCU 120 while the vehicle is traveling. Power storage device 110 is also charged with power received through PCU 120, the power being generated by MG 130 upon braking through a regenerative braking system of the vehicle.

System main relay SMR is provided between PCU 120 and a pair of power lines PL1, NL1 which are connected to power storage device 110, and is turned on by ECU 160 when a vehicle system is activated by a start switch or the like not shown.

PCU 120 is a drive for driving MG 130, and includes a power conversion device, such as a converter or an inverter. PCU 120 is controlled by ECU 160, and converts direct-current (DC) power, received from power storage device 110, into alternating-current (AC) power for driving MG 130. PCU 120 also converts AC power, generated by MG 130, into DC power and outputs the DC power to power storage device 110.

MG 130 is, typically, an AC rotating electric machine, for example, a three-phase AC synchronous motor which includes a rotor having a permanent-magnet embedded therein. MG 130 is driven by PCU 120 to generate a rotational driving force, and the driving force generated by MG 130 is transmitted to driving wheels 140 through mechanical power transmission gear 135. In contrast, during, for example, braking of the vehicle, MG 130 operates as a generator for power regeneration. Power generated by MG 130 is supplied to power storage device 110 through PCU 120.

Charge relay RY is provided between a pair of power lines DCL1, DCL2, which are connected to inlet 150, and a pair of power lines PL2, NL2, which are connected to the pair of power lines PL1, NL1. Charge relay RY is turned on by ECU 160 during the external charging.

During the external charging, inlet 150 receives charging power supplied from charging station 300. During the external charging, the connector of charging station 300 is connected to inlet 150, and DC power output from charging station 300 is supplied to power storage device 110 through inlet 150, the pair of power lines DCL1, DCL2, charge relay RY, the pair of power lines PL2, NL2, and the pair of power lines PL1, NL1.

DCM 170 is a communication module for communicating with server 200 (FIG. 1), and is configured to allow vehicle 100 (ECU 160) and server 200 to perform bidirectional data communication with each other through the communication network.

GPS receiver 172 identifies the current location of the vehicle 100 based on a radio wave from an artificial satellite, and outputs the identified location information to ECU 160. The location information identified by GPS receiver 172 can be used by, for example, a navigation device (not shown). In Embodiment 1, the location information identified by GPS receiver 172 is also transmitted to server 200 through DCM 170.

CAN communication unit 174 is configured to allow vehicle 100 (ECU 160) and charging station 300 to perform CAN communication with each other during the external charging. Embodiment 1 is described with reference to performing DC charging according to the CHAdeMO (registered trademark) method. The communications between vehicle 100 and charging station 300 are also performed according to a CAN communication protocol employed by CHAdeMO.

Note that the charging method that can be employed by vehicle 100 according to the present disclosure is not limited to the CHAdeMO method. Vehicle 100 can also employ, for example, the combo (Combined Charging System) method which is promoted mainly by the United States and Europe for the standardization. The communications between vehicle 100 and charging station 300 are also not limited to the CAN communication employed in the CHAdeMO method, and may be performed through power line communication (PLC) employed in the combo method or through wireless communication.

While the vehicle is traveling, ECU 160 turns on system main relay SMR and controls PCU 120, thereby controlling the driving of MG 130 and charging and discharging of power storage device 110. ECU 160 also turns on charge relay RY and transmits a charging start request or a charging current command value, etc. to charging station 300 through CAN communication unit 174 to perform the external charging. ECU 160 further calculates SOC (State Of Charge) for power storage device 110. When SOC reaches a predetermined upper limit, ECU 160 transmits a charging halt request to charging station 300 through CAN communication unit 174 to turn off the charge relay RY. Note that as the method of calculation of SOC, various known methods can be used, including a method using an OCV (Open Circuit Voltage)—SOC curve (a map, etc.) indicative of the relationship between the OCV and the SOC, or a method using an integrated value of a charge current and a discharge current.

Charging station 300 is a charging facility for supplying power to vehicle 100. Charging station 300 may be a private station installed in a garage, or a public station installed in a public facility. Charging station 300 is a fast charging station capable of supplying several tens of kW to several hundreds of kW of DC power, for example. The charging cable of charging station 300 is provided with a connector connectable to inlet 150 of vehicle 100. While the connector is connected to inlet 150, DC power can be supplied from charging station 300 to vehicle 100, and CAN communication is allowed between charging station 300 and vehicle 100.

Note that data that is transmitted from vehicle 100 to charging station 300 while the connector of charging station 300 is connected to inlet 150, includes, for example, a charging start request, a charging halt request, the charging current command value, and a charging voltage upper limit, etc. The data that is transmitted from charging station 300 to vehicle 100 includes, for example, maximum output information (such as possible output current value and possible output voltage value), present output information (such as present output current value and present output voltage value), etc.

FIG. 3 is a diagram detailing configurations of ECU 160 included in vehicle 100 and related devices, and server 200. Referring to FIG. 3, ECU 160 included in vehicle 100 includes a central processing unit (CPU) 161, memories (ROM: Read Only Memory and RAM: Random Access Memory) 162, and an I/O buffer 163. CPU 161 deploys a program, which is stored in the ROM, into the RAM or the like and executes the program. Processing, which is performed by ECU 160, is described in the program stored in the ROM.

ECU 160, DCM 170, sensors 180, GPS receiver 172, and CAN communication unit 174 are connected to a vehicle network 190. ECU 160 is capable of CAN communication with each device through vehicle network 190.

When the connector of charging station 300 is connected to inlet 150 (FIG. 2), ECU 160 exchanges various information with charging station 300 through CAN communication unit 174 and performs the external charging. ECU 160 also acquires the location information from GPS receiver 172, and acquires a detection value by each sensor included in sensors 180. ECU 160 further exchanges various information with server 200 through DCM 170 and a communication network (not shown).

Server 200 includes a communication device 210, a storage device 220, a weather information acquisition unit 225, and a processor 230. Communication device 210 is configured to communicate with DCM 170, included in vehicle 100, through the communication network.

Storage device 220 includes a charging station information database (DB) 221 and a flooding information database (DB) 222. Charging station information DB 221 stores information about each charging station that is available to vehicle 100 for external charging. Vehicle 100 can also perform the external charging using charging stations other than charging station 300, and charging station information DB 221 stores information (the location information, powering capability, the status of usage, etc.) about each such charging station.

Flooding information DB 222 stores information indicative of prediction of flood damage for each region. Specifically, flooding information DB 222 stores information provided by flooding hazard maps (which may be referred to as a flood hazard map or the like) issued from respective municipalities, storing information indicative of presence or absence and a degree (e.g., the depth of flooding) of flooding for each region (district) which are expected from overflow of the river, storm surge, etc.

Note that the information stored in flooding information DB 222 may be updated, as appropriate, by an administrator of server 200, or may be acquired by server 200 from servers of respective municipalities through communication networks, according to arrangements made with the respective municipalities.

Figure 4:
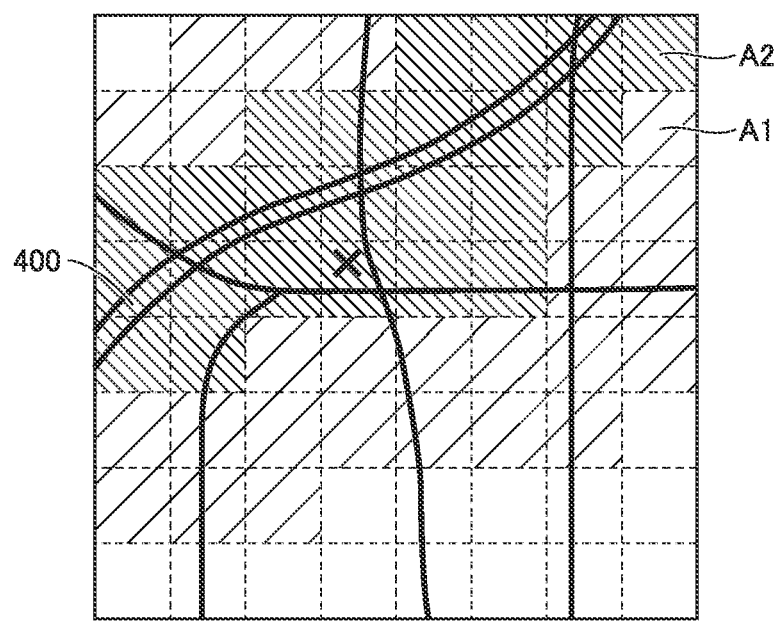
FIG. 4 is a diagram showing, in a map, one example flooding information stored in a flooding information DB.

FIG. 4 is a diagram showing, in a map, one example flooding information stored in flooding information DB 222. Referring to FIG. 4, the region shown in the map is divided into given sizes of districts, the map showing an expected degree of flooding for each district.

For example, an area A1 in lighter hatching indicates districts an expected flooded level for which is a first level (e.g., 0.1 to 0.5 m). An area A2 in denser hatching indicates districts an expected flooded level for which is a second level (e.g., higher than 0.5 m), which is higher than the first level, due to the fact that a river 400 is in close proximity. The areas without hatching indicate districts an expected flooded level for which is a zero level (e.g., less than 0.1 m).

Note that the cross mark in the figure indicates a place where charging station 300 is installed. In this example, charging station 300 is installed in a district an expected flooded level for which is the second level.

Referring again to FIG. 3, weather information acquisition unit 225 acquires information related to rainfall in a region where the external charging of vehicle 100 is performed. For example, weather information acquisition unit 225 is configured to access, for example, a server of the Japan Meteorological Agency and acquire AMeDAS observation data that is periodically provided by the Japan Meteorological Agency. As server 200 acquires the location information of vehicle 100 from vehicle 100 for the external charging of vehicle 100, weather information acquisition unit 225 acquires AMeDAS observation data that encompasses the region that covers the location indicated by that location information.

Note that, as the information related to rainfall, weather information acquisition unit 225 may acquire, in addition to the AMeDAS observation data related to rainfall, the issuing status or the like of special warning, river flooding information, or evacuation information (evacuation recommendation or evacuation instruction), etc. for a region that covers the location indicated by the location information acquired from vehicle 100. These information each can be issued upon occurrence of excessive rain that can cause flood damage. When at least one of these information is issued, it may be determined that it is excessively raining in the region.

Processor 230 includes a CPU, memories (ROM and RAM), and an I/O power buffer (none of which are shown). When the connector of charging station 300 is connected to inlet 150 of vehicle 100, the location information of vehicle 100 is transmitted from vehicle 100 to server 200. As the location information of vehicle 100 is acquired, processor 230 acquires weather information by weather information acquisition unit 225, and acquires flooding information from flooding information DB 222, about the region that covers the location indicated by the location information of vehicle 100. Based on the acquired weather information and flooding information, processor 230 then determines whether vehicle 100 is likely to be inundated with water during external charging through charging station 300. In the following, processing performed by processor 230 and ECU 160 (vehicle 100) associated with the external charging of vehicle 100, will be described in detail.

<Description of Processing Performed by ECU 160 and Server 200 Associated with External Charging>

When the external charging is performed under rainfall conditions, water likely to enter the point of electrical connection (e.g., the point of connection between the connector of the charging cable and the inlet of the vehicle) between the charging facility and the vehicle. For this reason, it is contemplated that a rain sensor for detecting rain is provided and the external charging is stopped if rain is detected by the rain sensor.

When the rain sensor is used to determine whether to stop the external charging, if the external charging is free of influence of rain itself due to the fact that a place (such as a garage or charging station), where the external charging is performed, is roofed, the external charging is permitted. However, even if no rain is detected by the rain sensor due to the roof, when heavy rainfall is caused by typhoon or the like, the vehicle may be inundated with water, depending on a place (region) where the external charging is performed. If the rain sensor is used to determine whether to stop the external charging, the external charging cannot be stopped under such circumstances.

For this reason, in charging system 10 according to Embodiment 1, weather information related to rainfall in a region encompassing the place in which the external charging is performed, and the flooding information (the flooding hazard map) indicative of flood damage expected to occur in the region, are acquired. Based on the acquired weather information and flooding information, determination is then made as to whether vehicle 100 is likely to be inundated with water during the external charging or while vehicle 100 is waiting for external charging. If vehicle 100 is likely to be inundated with water, the external charging is stopped. This allows the external charging to be stopped when vehicle 100 is likely to be inundated with water due to excessive rain caused by typhoon or the like even if no rain is detected by the rain sensor due to the fact that the place where the external charging is performed is roofed.

Figure 5:
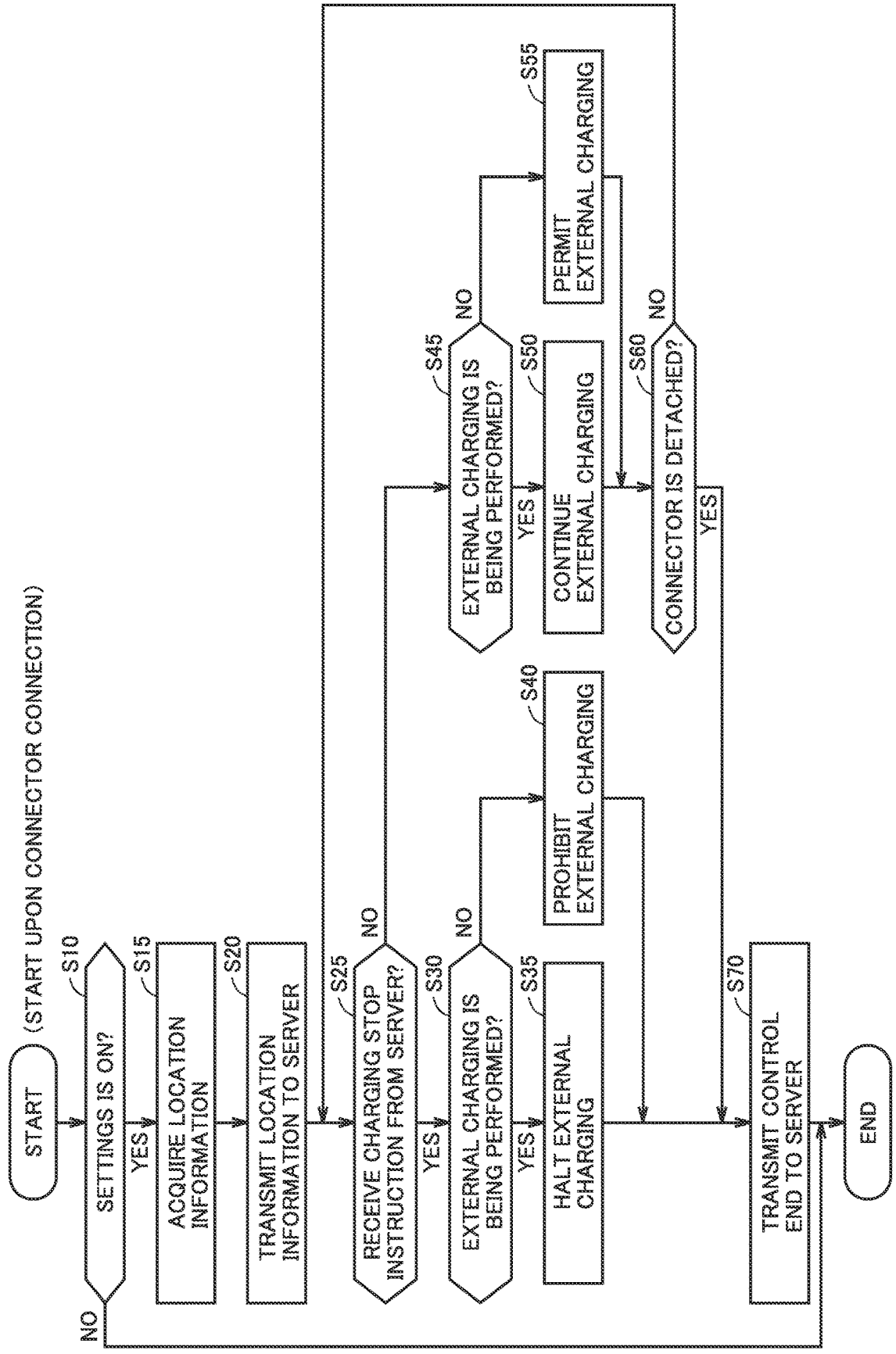
FIG. 5 is a flowchart showing one example procedure of processes which are performed by the ECU included in the vehicle to perform external charging.

FIG. 5 is a flowchart showing one example procedure of processes which are performed by ECU 160 included in vehicle 100 for the external charging. The series of processes illustrated in the flowchart is initiated when the connector of the charging cable is connected to inlet 150 of vehicle 100.

Referring to FIG. 5, generally, when the connector of the charging cable is connected to inlet 150. ECU 160 transmits the location information of vehicle 100 to server 200. Server 200 then determines whether vehicle 100 is likely to be inundated with water. If vehicle 100 is likely to be inundated with water, server 200 transmits an external charging stop instruction to vehicle 100. When vehicle 100 receives the external charging stop instruction from server 200, ECU 160 stops the external charging.

Describing specifically, ECU 160 determines whether the settings, indicating that execution of the above processing is permitted by the user, is ON (step S10). The user may intentionally perform the external charging in order to evacuate by vehicle 100, or vehicle 100 may not be inundated with water because the external charging is performed on an upper floor of a multi-storied parking lot or the like. For this reason, in Embodiment 1, the user is allowed to switch whether to perform the series of processes illustrated in the flowchart. The user can perform the external charging by turning the settings to OFF by a given switch or the like, without performing a series of processes shown below. If the settings are determined to be OFF at step S10 (NO at step S10), ECU 160 proceeds to END, without performing the subsequent series of processes.

If the settings are determined to be ON at step S10 (YES at step S10), ECU 160 acquires location information from GPS receiver 172, the location information indicating the current location of vehicle 100 (step S15). ECU 160 then transmits the acquired location information to server 200 (step S20).

Next, ECU 160 determines whether vehicle 100 receives from server 200 the charging stop instruction for instructing vehicle 100 to stop the external charging (step S25). If vehicle 100 receives the charging stop instruction from server 200 (YES at step S25), ECU 160 determines whether the external charging is currently being performed (step S30).

If the external charging is being performed (YES at step S30), ECU 160 halts the external charging (step S35). In contrast, if external charging is not being performed, such as, for example, vehicle 100 is waiting for timer charging (NO at step S35), ECU 160 prohibits external charging thereafter (step S40). For example, if vehicle 100 is waiting for timer charging, the external charging is not performed even though the start time of which arrives.

ECU 160 then transmits a control end to server 200, the control end indicating that the series of processes has been completed (step S70), and proceeds to END.

In contrast, if it is determined that vehicle 100 has not received the charging stop instruction from server 200 at step S25 (NO at step S25), ECU 160 determines whether the external charging is currently being performed (step S45).

If external charging is being performed (YES at step S45), ECU 160 continues the external charging (step S50). In contrast, if external charging is not being performed, such as, for example, vehicle 100 is waiting for timer charging (NO at step S45), ECU 160 permits external charging to be performed (step S55). If, for example, vehicle 100 is waiting for timer charging, external charging is performed when the start time of which arrives.

Next, ECU 160 determines whether the connector of the charging cable is detached from inlet 150 (step S60). If the connector is not detached from inlet 150 (NO at step S60), ECU 160 returns to step S25, and determines again whether vehicle 100 receives a charging stop instruction from server 200.

If the connector is determined to be detached from inlet 150 at step S60 (YES at step S60), ECU 160 proceeds to step S70 and transmits the control end to server 200.

Figure 6:
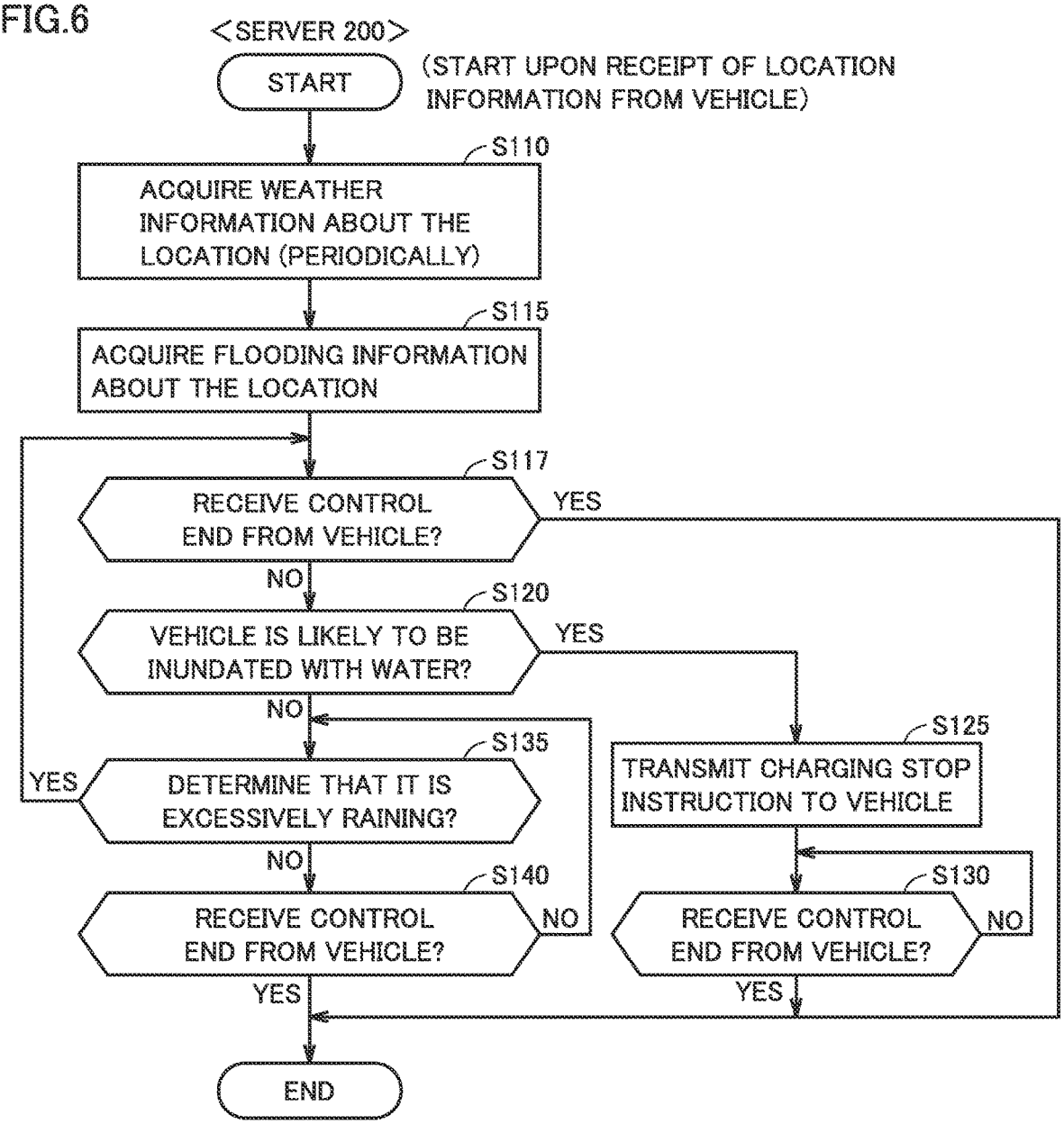
FIG. 6 is a flowchart showing one example procedure of processes which are performed by a processor included in the server.

FIG. 6 is a flowchart showing one example procedure of processes performed by processor 230 included in server 200. The series of processes illustrated in the flowchart is initiated when server 200 receives the location information of vehicle 100 from vehicle 100.

Referring to FIG. 6, processor 230 acquires weather information about a region that covers the location indicated by the location information received from vehicle 100 (step S110). The weather information relates to rainfall in the region, and includes AMeDAS observation data regarding rainfall, as described above. As the weather information, processor 230 may acquire the issuing status or the like of special warning, river flooding information, or evacuation information (evacuation recommendation or evacuation instruction), etc. for the region.

Note that the AMeDAS observation data for the region is thereafter periodically acquired until the series of processes is completed. Moreover, if the issuing status or the like of special warning, river flooding information, or evacuation information, etc. for the region is acquired as the weather information, such information is acquired as it is issued, until the series of processes is completed.

Next, processor 230 acquires, from flooding information DB 222, the flooding information about a district that covers the location indicated by the location information received from vehicle 100 (step S115). Specifically, processor 230 acquires, from flooding information DB 222, an expected flooded level in the district that covers the place where the external charging of vehicle 100 is performed.

Next, processor 230 determines whether server 200 receives a signal indicative of the control end from vehicle 100 (step S117). If server 200 receives the control end from vehicle 100 (YES at step S117), processor 230 proceeds to END, without performing the subsequent processes.

If the receipt of the control signal is not acknowledged at step S117 (NO at step S117), processor 230 determines, based on the weather information acquired at step S110 and the flooding information acquired at step S115, whether vehicle 100 is likely to be inundated with water at the place (district) where the external charging of vehicle 100 is performed (step S120).

Figure 7:
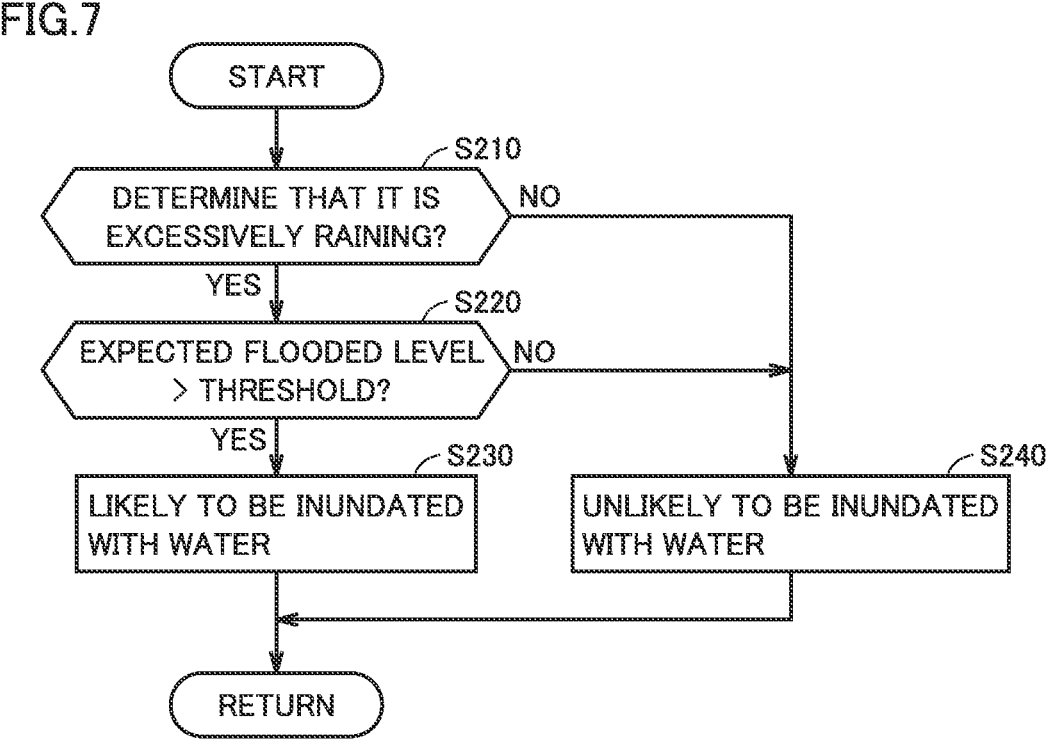
FIG. 7 is a flowchart detailing one example procedure of processes performed at step S120 shown in FIG. 6.

FIG. 7 is a flowchart showing one example method of determination as to whether vehicle 100 is likely to be inundated with water. Referring to FIG. 7, processor 230 determines whether it is excessively raining in the region, based on the weather information acquired at step S110 of FIG. 6 (step S210). Specifically, processor 230 determines that it is excessively raining if rainfall in the region, acquired as the weather information, is above a predetermined amount. Alternatively, when the issuing status or the like of special warning, river flooding information, or evacuation information (evacuation recommendation or evacuation instruction), etc. for the region is acquired as the weather information, processor 230 may determine that it is excessively raining if at least one of these information is issued.

If processor 230 determines that it is excessively raining in the region at step S210 (YES at step S210), processor 230 determines, based on the flooding information acquired at step S115 of FIG. 6, whether an expected flooded level in the region is higher than a threshold (step S220). For example, as described with reference to FIG. 4, if the expected flooded level in the region is higher than the first level (e.g., 0.1 to 0.5 m), that is, the expected flooded level is the second level or above (e.g., higher than 0.5 m), the expected flooded level in the region is determined to be higher than the threshold.

If the expected flooded level is determined to be higher than the threshold at step S220 (YES at step S220), processor 230 determines that vehicle 100 is likely to be inundated with water (step S230).

In contrast, if processor 230 determines that it is not excessively raining in the region at step S210 (NO at step S210) or determines that the expected flooded level is less than or equal to the threshold at step S220 (NO at step S220), processor 230 determines that vehicle 100 is not (less) likely to be inundated with water (step S240).

Referring again to FIG. 6, if processor 230 determines dial vehicle 100 is likely to be inundated with water at step S120 (YES at step S120), processor 230 transmits to vehicle 100 a charging stop instruction instructing vehicle 100 to stop the external charging (step S125). Thereafter, if processor 230 receives a signal indicative of the control end from vehicle 100 (YES at step S130), processor 230 proceeds to END.

In contrast, if processor 230 determines that vehicle 100 is not (less) likely to be inundated with water at step S120 (NO at step S120), processor 230 determines whether it is excessively raining in the region, based on the weather information acquired at step S110 (step S135). Specifically, processor 230 determines that it is excessively raining if rainfall in the region acquired as the weather information is above the predetermined amount. Note that, here again, when the issuing status or the like of special warning, river flooding information, or evacuation information (evacuation recommendation or evacuation instruction), etc. for the region is acquired as the weather information, processor 230 may determine that it is excessively raining if at least one of these information is issued.

Process step S135 is provided for the following reasons. In other words, in the situation where the determination is made that it is not excessively raining because rainfall is initially below the predetermined amount when the connector of the charging cable is connected to inlet 150 of vehicle 100 and vehicle 100 is then determined as unlikely to be inundated with water at step S120, it is determined, again at step S120, whether vehicle 100 is likely to be inundated with water if rainfall thereafter grows more intense.

If processor 230 determines that it is excessively raining in the region at step S135 (YES at step S135), processor 230 returns to step S117. Due to this, processor 230 determines, again, whether vehicle 100 is likely to be inundated with water at step S120. If vehicle 100 is determined as likely to be inundated with water, the process is passed to step S125 at which a charging stop instruction is transmitted to vehicle 100.

Note that if the determination is made that it is excessively raining at step S135 (YES at step S135) and vehicle 100 is determined as unlikely to be inundated with water at step S120 (if the flooding information indicates no flooding), the process steps S120 and S135 can become an infinite loop. The above step S117 is therefore provided.

If processor 230 determines that it is not excessively raining at step S135 (NO at step S135), processor 230 determines whether server 200 receives the control end from vehicle 100 (step S140). If the receipt of the control end from vehicle 100 is not acknowledged (NO at step S140), processor 230 returns to step S135. In contrast, if the receipt of the control end from vehicle 100 is acknowledged (YES at step S140), processor 230 proceeds to END, which ends the series of processes.

While, in the above, the determination as to whether vehicle 100 is likely to be inundated with water is made (i) when the connector of the charging cable is connected to inlet 150 of vehicle 100 and server 200 receives the location information from vehicle 100, and (ii) when the rainfall in the region thereafter grows more intense (YES at step S135), it should be noted that the determination as to whether vehicle 100 is likely to be inundated with water may be made periodically, instead of the latter case.

As described above, in Embodiment 1, based on the weather information and the flooding information for the place (region) where the external charging is performed, the determination is made as to whether vehicle 100 is likely to be inundated with water while it is stationary in charging station 300. This allows the external charging to be stopped (halted or prohibited) when vehicle 100 may be inundated with water due to excessive rain caused by typhoon or the like, even if no rain is detected by the rain sensor due to the fact that the place in which the external charging is performed is roofed.

Moreover, according to Embodiment 1, when the connector of the charging cable is connected to inlet 150 of vehicle 100, it is determined whether vehicle 100 is likely to be inundated with water, thereby allowing the external charging to be prohibited from being performed before it is initiated. Furthermore, according to Embodiment 1, since determination as to whether vehicle 100 is likely to be inundated with water is made also when the rainfall grows more intense, the external charging can be halted if rainfall increases during the external charging and the vehicle is likely to be inundated with water.

According to Embodiment 1, since the determination as to whether vehicle 100 is likely to be inundated with water can be made with accuracy because the determination is made based on the weather information and flooding information about the place (region) where the external charging is performed. For example, even if it is excessively raining, vehicle 100 is less likely to be inundated with water if flood damage is determined as less likely to occur in the place (region) where the external charging is performed. Thus, the external charging can be performed. Alternatively, even if flood damage is determined as highly likely to occur in the place (region) where the external charging is performed, vehicle 100 is less likely to be inundated with water if it is not excessively raining to a degree that can cause flooding. Thus, the external charging can be performed.

Moreover, according to Embodiment 1, server 200 acquires the weather information and the flooding information, and determines whether vehicle 100 is likely to be inundated with water. Consequently, according to Embodiment 1, there is no need to incorporate these features into vehicle 100.

Embodiment 2

In Embodiment 1, when the connector of the charging cable is connected to inlet 150 of vehicle 100, the location information indicative of the current location of vehicle 100 is transmitted to server 200, and server 200 determines whether vehicle 100 is likely to be inundated with water in the place (region) where the external charging is performed. In Embodiment 2, vehicle 100 determines whether vehicle 100 is likely to be inundated with water.

An overall configuration of a charging system 10 and configurations of a vehicle 100 and a server 200, according to Embodiment 2, are the same as the configurations illustrated in FIGS. 1 to 3.

Figure 8:
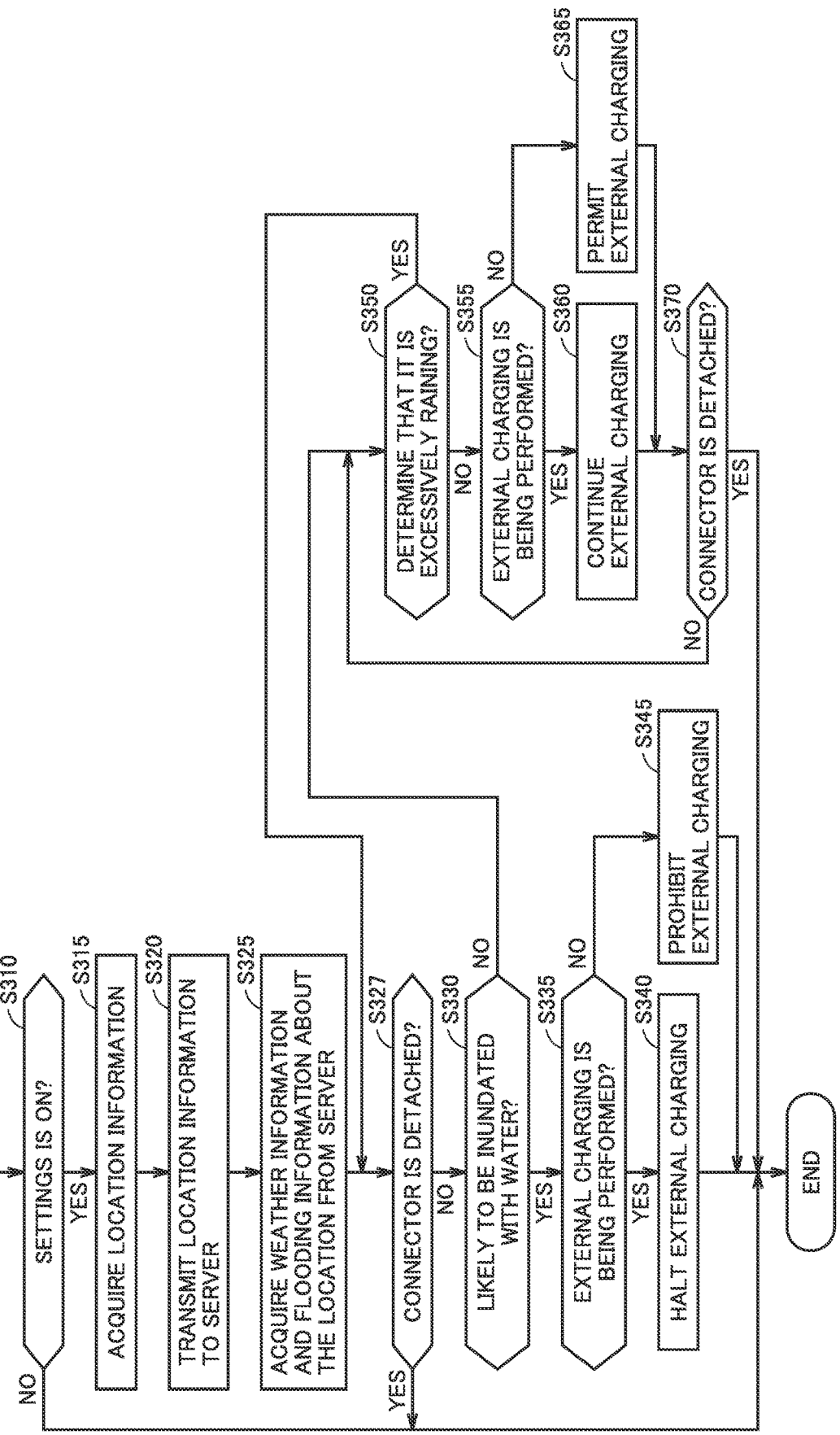
FIG. 8 is a flowchart showing one example procedure of processes which are performed by an ECU included in a vehicle according to Embodiment 2 to perform external charging.

FIG. 8 is a flowchart showing one example procedure of processes which are performed by an ECU 160 included in vehicle 100 according to Embodiment 2 to perform external charging. The series of processes illustrated in this flowchart is also initiated when the connector of the charging cable is connected to an inlet 150 of vehicle 100.

Referring to FIG. 8, process steps S310 to S320 are the same as the process steps S10 to S20, respectively, illustrated in FIG. 5. In response to the location information of vehicle 100 being transmitted to server 200 at step S320, ECU 160 acquires the weather information and flooding information about a region that covers the location of vehicle 100 (step S325). The weather information and flooding information are as described with reference to Embodiment 1. Processing by server 200 will be described below with reference to FIG. 9.

Note that the AMeDAS observation data for the region is thereafter acquired periodically from server 200 until the series of processes is completed. Moreover, if the issuing status or the like of special warning, river flooding information, or evacuation information, etc. in the region is acquired from server 200 as the weather information, such information is acquired as it is issued, until the series of processes is completed.

Next, ECU 160 determines whether the connector of the charging cable is detached from inlet 150 (step S327). If the connector is determined to be detached from inlet 150 (YES at step S327), ECU 160 determines that the external charging has been completed, and proceeds to END.

If the connector is not detached from inlet 150 (NO at step S327), ECU 160 determines whether vehicle 100 is likely to be inundated with water in the place (district) in which the external charging of vehicle 100 is performed, based on the weather information and flooding information which are acquired from server 200 at step S325 (step S330). The method of determination as to whether vehicle 100 is likely to be inundated with water is executed by the same procedure as illustrated in the flowchart of FIG. 7.

If ECU 100 determines that vehicle 100 is likely to be inundated with water at step S330 (YES at step S330), ECU 160 determines whether the external charging is currently being performed (step S335).

If the external charging is being performed (YES at step S335), ECU 160 halts the external charging (step S340). In contrast, if external charging is not being performed, such as, for example, vehicle 100 is waiting for timer charging (NO at step S335), ECU 160 prohibits external charging thereafter (step S345). For example, if vehicle 100 is waiting for timer charging, external charging is not performed even though the start time of which arrives.

In contrast, if ECU 160 determines that vehicle 100 is not (less) likely to be inundated with water at step S330 (NO at step S330), ECU 160 determines whether it is excessively raining at the current location, based on the weather information acquired at step S325 (step S350). Specifically, ECU 160 determines that it is excessively raining if rainfall at the current location acquired as the weather information is above a predetermined amount. Note that, here again, when the issuing status or the like of special warning, river flooding information, or the evacuation information (evacuation recommendation or evacuation instruction), etc. for the current location is acquired as the weather information, ECU 160 may determine that it is excessively raining if at least one of these information is issued.

If ECU 160 determines that it is excessively raining in the current location at step S350 (YES at step S350), ECU 160 returns to step S327. Due to this, it is determined, again at step S330, whether vehicle 100 is likely to be inundated with water. If vehicle 100 is determined as likely to be inundated with water, the process is passed to step S335 and the external charging is stopped.

In contrast, if ECU 160 determines that it is not excessively raining at step S350 (NO at step S350), ECU 160 determines whether external charging is currently being performed (step S355).

If external charging is currently being performed (YES at step S355), ECU 160 continues the external charging (step S360). In contrast, if external charging is not being performed, such as, for example, vehicle 100 is waiting for timer charging (NO at step S355), ECU 160 permits the external charging to be performed (step S365). For example, if vehicle 100 is waiting for timer charging, external charging is performed when the start time of which arrives.

Next, ECU 160 determines whether the connector of the charging cable is detached from inlet 150 (step S370). If the connector is not detached from inlet 150 (NO at step S370), ECU 160 returns to step S350, and it is determined, again, whether it is excessively raining at the current location.

If the connector is determined to be detached from inlet 150 at step S370 (YES at step S370), ECU 160 proceeds to END, which ends the series of processes.

FIG. 9 is a flowchart showing one example procedure of processes which are performed by a processor 230 included in server 200 according to Embodiment 2. The series of processes illustrated in the flowchart is also initiated when processor 230 receives the location information from vehicle 100.

Referring to FIG. 9, process steps S410, S420 are the same as process steps S110, S115, respectively, illustrated in FIG. 6. As processor 230 acquires the weather information and flooding information about a district that covers the location indicated by the location information received from vehicle 100, processor 230 transmits the acquired weather information and flooding information to vehicle 100 (step S430).

As described above, according to Embodiment 2, vehicle 100 is capable of determining whether vehicle 100 is likely to be inundated with water based on the weather information and flooding information acquired from server 200, and stopping external charging based on a result of the determination.

Embodiment 3

In the above Embodiment 2, the location information of vehicle 100 is transmitted to server 200, the weather information and flooding information acquired by server 200 is transmitted to vehicle 100, and vehicle 100 determines whether vehicle 100 is likely to be inundated with water.

In Embodiment 3, the acquisition of the weather information and the flooding information is also carried out by the vehicle. In other words, in Embodiment 3, the vehicle, by itself, acquires the weather information and the flooding information, determines whether the vehicle is likely to be inundated with water, and stops/continues external charging based on a result of the determination.

FIG. 10 is a diagram detailing configurations of an ECU 160 included in a vehicle 100A according to Embodiment 3 and related devices. Referring to FIG. 10, vehicle 100A includes a flooding information DB 185 and sensors 180A, instead of DCM 170 and sensors 180, respectively, included in the configuration of vehicle 100 according to Embodiment 1 shown in FIG. 3.

Flooding information DB 185 is basically the same as flooding information DB 222 included in server 200 according to Embodiment 1 shown in FIG. 3. In other words, flooding information DB 185 stores information indicative of prediction of flood damage for each region.

Note that the information stored in flooding information DB 185 may be updated, as appropriate, by a user of vehicle 100A, or may be acquired by vehicle 100A from servers of respective municipalities through communication networks, according to arrangements made with the respective municipalities.

Sensors 180A include an atmospheric pressure sensor, in addition to sensors 180. The atmospheric pressure sensor measures atmospheric pressure around vehicle 100A, and outputs the measurement to ECU 160. The atmospheric pressure sensor may take several forms. Typically, for example, a piezoresistive or capacitive atmospheric pressure sensor is used. The measurement by the atmospheric pressure sensor is used for weather forecast which is made by vehicle 100A, as described below.

FIG. 11 is a flowchart showing one example procedure of processes which are performed by ECU 160 included in vehicle 100A according to Embodiment 3 to perform external charging. The series of processes illustrated in the flowchart is also initiated when the connector of the charging cable is connected to an inlet 150 of vehicle 100A.

Referring to FIG. 11, process step S510 is the same as process step S10 illustrated in FIG. 5. If the settings are determined to be ON at step S510 (YES at step S510), ECU 160 acquires a measurement of atmospheric pressure from the atmospheric pressure sensor (step S515), and forecasts the weather at the current location from the measurement of the atmospheric pressure (step S520). Here, ECU 160 may forecast weather that can cause excessive rain, and forecasts approaching of typhoon or the like based on, for example, seduction in atmospheric pressure (e.g., 950 hPa or less).

Next, ECU 160 acquires the current location information of vehicle 100A from a GPS receiver 172 (step S525). ECU 160 then acquires the flooding information, from flooding information DB 185, about a district that covers the location indicated by the acquired location information (step S530). Specifically, ECU 160 acquires, from flooding information DB 185, an expected flooded level in the district that covers the place in which the external charging of vehicle 100A is performed.

Next, ECU 160 determines whether the connector of the charging cable is detached from inlet 150 (step S532). If the connector is determined to be detached from inlet 150 (YES at step S532), ECU 160 determines that the external charging has been completed, and proceeds to END.

If the connector is not detached from inlet 150 (NO at step S532), ECU 160 determines, based on the weather forecasted at step S520 and the flooding information acquired at step S530, whether vehicle 100A is likely to be inundated with water in the place (district) in which the external charging of vehicle 100A is performed (step S535).

The method of determination as to whether vehicle 100A is likely to be inundated with water is performed by the same procedure as illustrated in the flowchart of FIG. 7. Specifically, when determination is made, from a result of weather forecast at step S520, that it is excessively raining due to typhoon or the like approaching, and it is further determined, based on the flooding information acquired at step S530, that an expected flooded level in the current location is higher than a threshold, ECU 160 determines that vehicle 100A is likely to be inundated with water.

The subsequent process steps S540 to S575 are the same as process steps S335 to S370, respectively, according to Embodiment 2 illustrated in FIG. 8.

As described above, according to Embodiment 3, the vehicle by itself (without communicating with a server outside the vehicle) is capable of determining whether vehicle 100A is likely to be inundated with water, and stopping the external charging based on a result of the determination.

Embodiment 4

In Embodiment 1, vehicle 100 and server 200 communicate with each other, and, if vehicle 100 is likely to be inundated with water, the external charging stop instruction is transmitted from server 200 to vehicle 100.

In Embodiment 4, a charging station and a server communicate with each other, and if a vehicle, which is supplied with power from the charging station, is likely to be inundated with water, a stop instruction for stopping the supply of power is transmitted from the server to the charging station.

Figure 12:
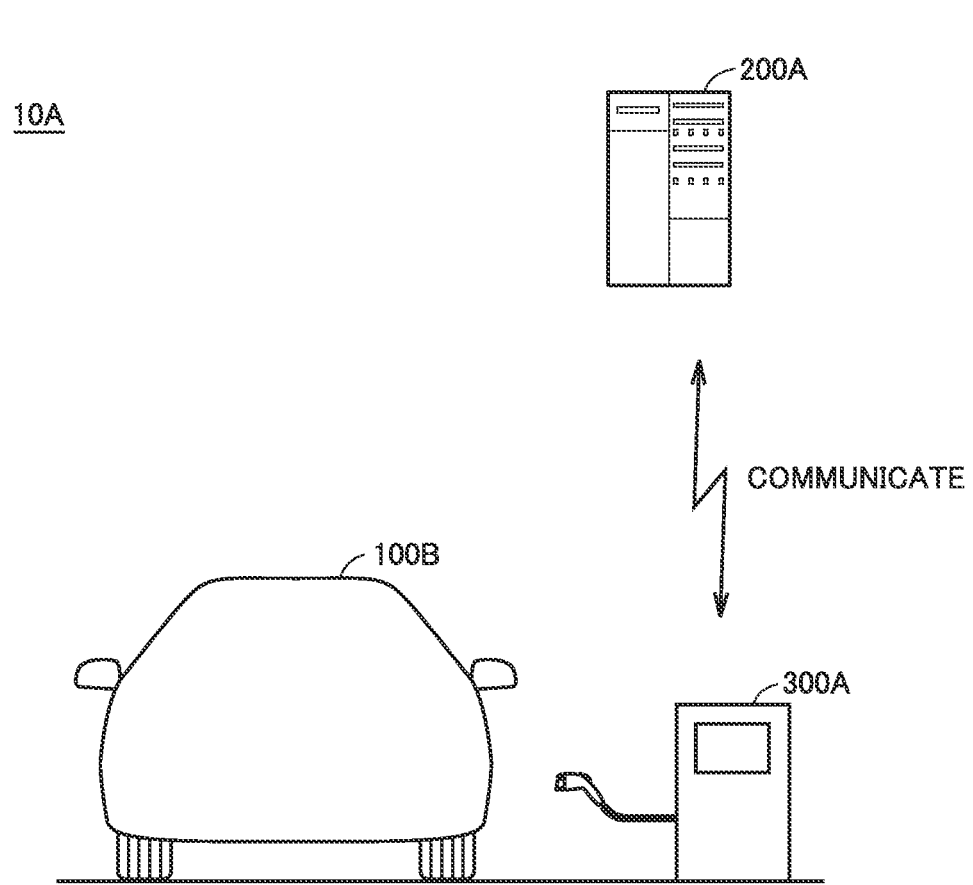
FIG. 12 is a diagram schematically showing an overall configuration of a charging system according to Embodiment 4.

FIG. 12 is a diagram schematically showing an overall configuration of a charging system according to Embodiment 4. Referring to FIG. 12, a charging system 10A includes a vehicle 100B, a server 200A, and a charging station 300A.

Server 200A and charging station 300A are configured to communicate with each other via a communication network (not shown) such as the Internet or a telephone line.

Similarly to vehicle 100 described with reference to FIG. 2, vehicle 100B is configured to be capable of external charging from charging station 300A. The communication of vehicle 100B with server 200A is not essential. Vehicle 100B may not include DCM 170 (FIG. 2) that is included in vehicle 100 according to Embodiment 1.

Server 200A communicates with charging station 300A through the communication network to receive necessarily information from charging station 300A and transmit necessarily information to charging station 300A. Server 200A, which is discussed in more detail below, determines whether vehicle 100B (charging station 300A) is likely to be inundated with water while vehicle 100B is stationary in charging station 300A, and if vehicle 100B is determined as likely to be inundated with water, transmits, to charging station 300A, a stop instruction for stopping supply of power to vehicle 100B.

Figure 13:
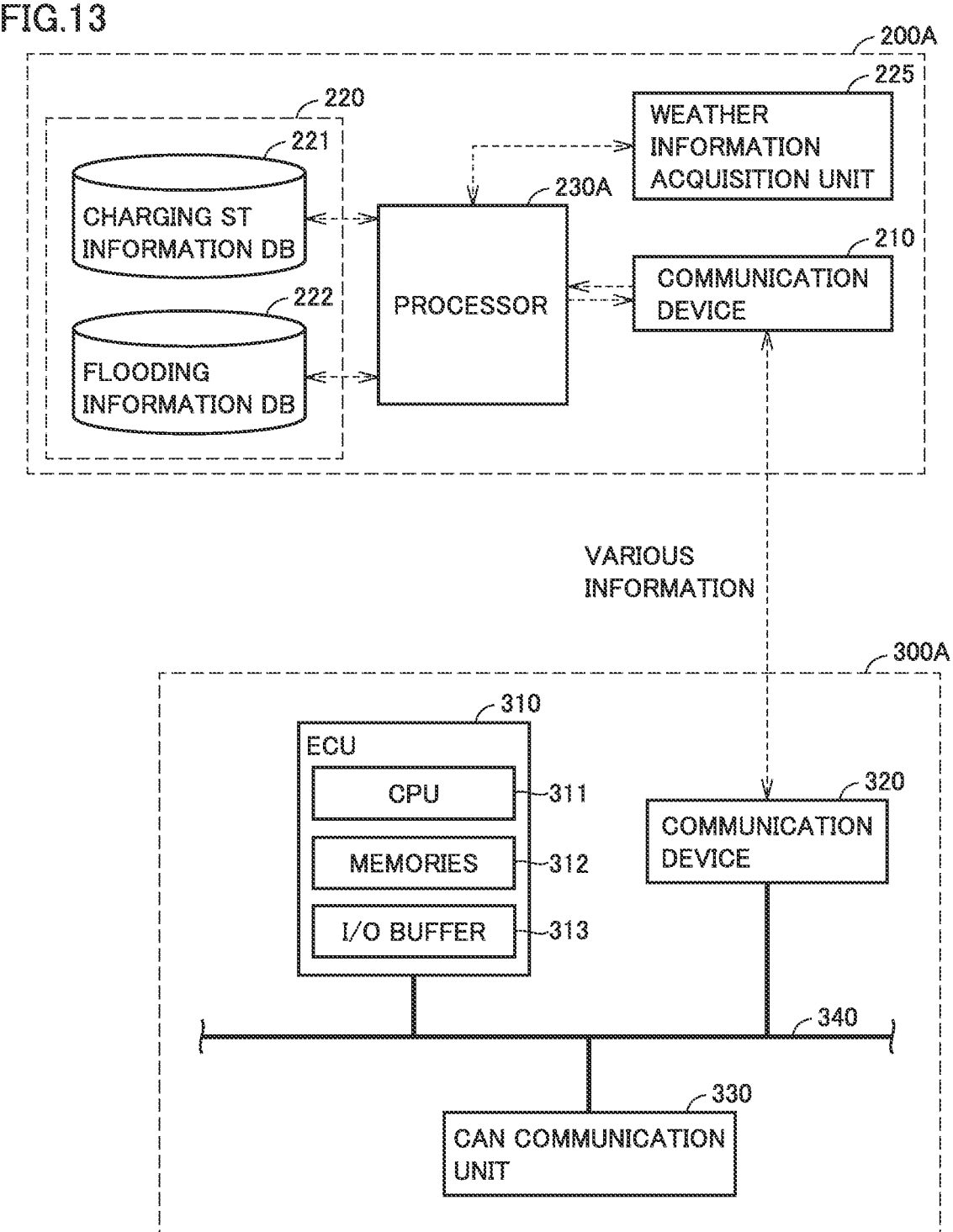
FIG. 13 is a diagram detailing configurations of a server and a charging station according to Embodiment 4.

FIG. 13 is a diagram detailing configurations of server 200A and charging station 300A according to Embodiment 4. Referring to FIG. 13, server 200A has the same configuration as the configuration of server 200 according to Embodiment 1 shown in FIG. 3, except for including a processor 230A, instead of processor 230. Processing performed by processor 230A will be described in detail, with reference to the flowchart.

Charging station 300A includes an ECU 310, a communication device 320, and a CAN communication unit 330. ECU 310 includes a CPU 311, memories (ROM and RAM) 312, and an I/O power buffer 313. CPU 311 deploys a program, which is stored in the ROM, into the RAM or the like and executes the program. Processing which is performed by ECU 310, is described in the program stored in the ROM.

ECU 310, communication device 320, and CAN communication unit 330 are connected to a communication bus 340, and ECU 310 is capable of CAN communication with each device through communication bus 340. When a connector of charging station 300A is connected to an inlet of vehicle 100B (FIG. 12), ECU 310 exchanges various information with vehicle 100B through CAN communication unit 330 to perform the external charging (supply power to vehicle 100B). ECU 310 also exchanges various information with server 200A through communication device 320 and a communication network (not shown).

Figure 14:
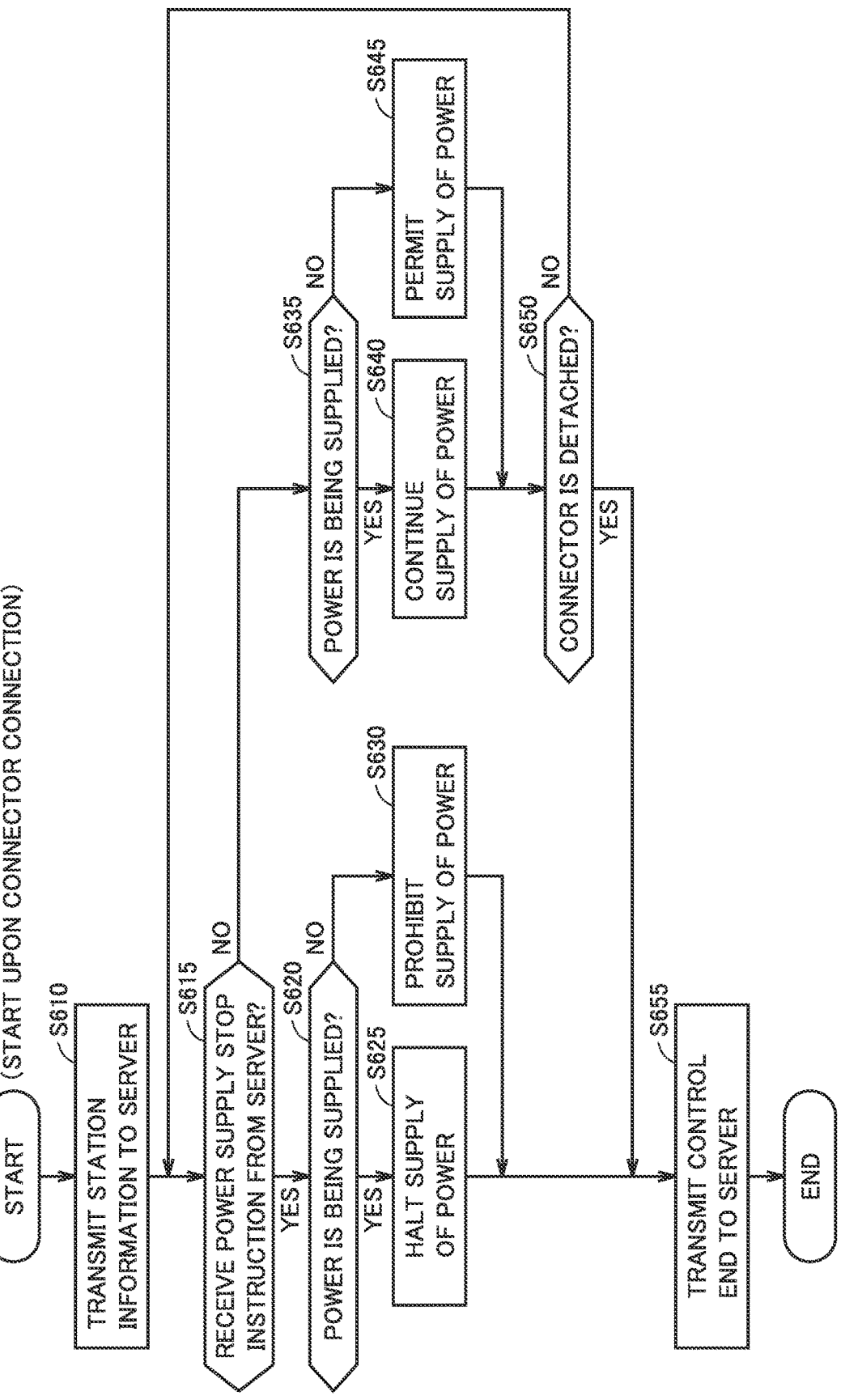
FIG. 14 is a flowchart showing one example procedure of processes which are performed by an ECU included in the charging station to perform external charging.

FIG. 14 is a flowchart showing one example procedure of processes which are performed by ECU 310 included in charging station 300A to perform the external charging. The series of processes illustrated in the flowchart is initiated when the connector of the charging cable is connected to the inlet of vehicle 100B. Note that vehicle 100B informs charging station 300A of whether the connector is connected to the inlet of vehicle 100B or not through the CAN communication, for example.

Referring to FIG. 14, when the connector of the charging cable is connected to the inlet of vehicle 100B, ECU 310 transmits the information about charging station 300A (station information) to server 200A (step S610). The station information includes, for example, ID information identifying charging station 300A, information indicative of the status of usage of charging station 300A, etc.

Server 200A then determines whether vehicle 100B that is connected to charging station 300A is likely to be inundated with water. If vehicle 100B that is connected to charging station 300A is likely to be inundated with water, server 200A transmits to charging station 300A a stop instruction for stopping the supply of power to vehicle 100B. Accordingly, ECU 310 determines whether charging station 300A receives, from server 200A, the stop instruction for stopping the supply of power to vehicle 100B (step S615).

Upon the receipt of the power supply stop instruction from server 200A (YES at step S615), ECU 310 determines whether power is currently being supplied to vehicle 100B (the external chaining is being performed) (step S620). If power is currently being supplied to vehicle 100B (YES at step S620). ECU 310 halts the supply of power to vehicle 100B (step S625).

In contrast, for example, if power is not being supplied to vehicle 100B, such as vehicle 100B is waiting for timer charging (NO at step S620). ECU 310 prohibits supply of power to vehicle 100B thereafter (step S630). For example, if vehicle 100R is waiting for timer charging, no power is supplied to vehicle 100B even though the start time of which arrives.

ECU 310 then transmits to server 200A a control end indicating that the series of processes has been completed, (step S655), and proceeds to END.

In contrast, when ECU 310 determines that charging station 300A has not received the power supply stop instruction from server 200A at step S615 (NO at step S615). ECU 310 determines whether vehicle 100B is currently being supplied with power (the external charging is being performed) (step S635).

If power is being supplied to vehicle 100B (YES at step S635), ECU 310 continues the supply of power to vehicle 100B (step S640). In contrast, if power is not being supplied to vehicle 100B, such as vehicle 100B is waiting for timer charging (NO at step S635), ECU 310 permits supply of power to vehicle 100B (step S645). For example, if vehicle 100B is waiting for timer charging, power is supplied to vehicle 100B when the start time of which arrives.

Next, ECU 310 determines whether the connector of the charging cable is detached from the inlet of vehicle 100B (step S650). Vehicle 100B informs charging station 300A of whether the connector is detached from the inlet of vehicle 100B or not through CAN communication, for example.

If the connector is not detached from the inlet of vehicle 100B (NO at step S650), ECU 310 returns to step S615 and determines again whether charging station 300A receives the power supply stop instruction from server 200. In contrast, if ECU 310 determines that the connector is detached from the inlet of vehicle 100B (YES at step S650), ECU 310 proceeds to step S655 at which ECU 310 transmits the control end to server 200A.

Figure 15:
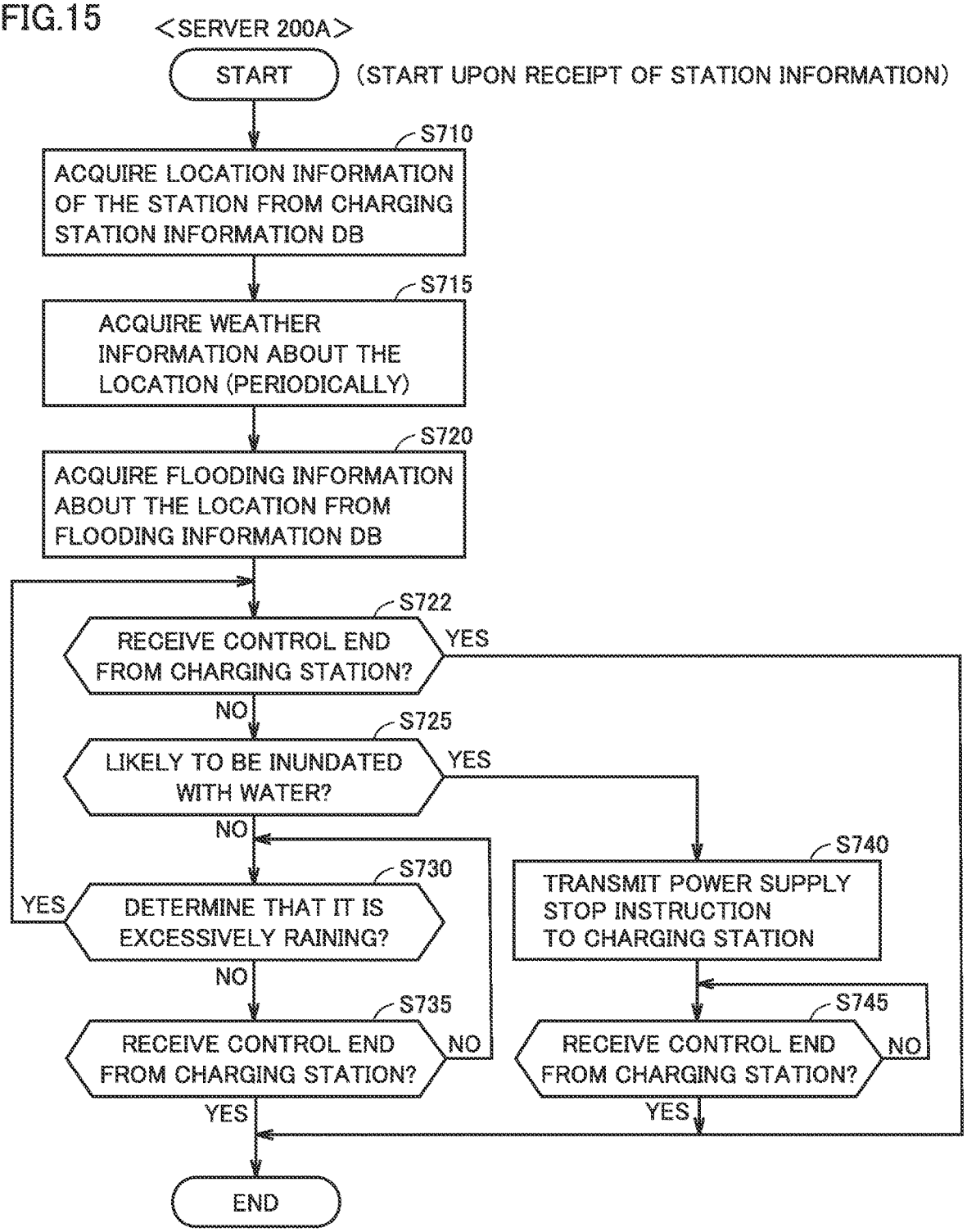
FIG. 15 is a flowchart showing one example procedure of processes which are performed by a processor included in a server according to Embodiment 4.

FIG. 15 is a flowchart showing one example procedure of processes performed by processor 230A included in server 200A according to Embodiment 4. The series of processes illustrated in the flowchart is initiated when processor 230A receives the station information from charging station 300A.

Referring to FIG. 15, upon the receipt of the station information from charging station 300A, processor 230A acquires the location information of charging station 300A from charging station information DB 221 (FIG. 13) (step S710). Next, processor 230A acquires weather information about a region that covers the location indicated by the location information (step S715). The weather information is as described with reference to Embodiment 1.

Next, processor 230A acquires, from flooding information DB 222, the flooding information about a district that covers the location indicated by the location information acquired at step S710 (step S720). The flooding information is also as described with reference to Embodiment 1.

Next, processor 230A determines whether processor 230A receives a signal indicative of the control end from charging station 300A (step S722). If processor 230A receives the control end from charging station 300A (YES at step S722), processor 230A proceeds to END, without performing the subsequent processes.

If the receipt of the control end is not acknowledged at step S722 (NO at step S722), processor 230A determines, based on the weather information acquired at step S715 and the flooding information acquired at step S720, whether vehicle 100B, connected to charging station 300A, is likely to be inundated with water (step S725). The method of determination as to whether the vehicle is likely to be inundated with water is performed by the same procedure as the flowchart illustrated in FIG. 7.

If processor 230A determines that vehicle 100B is likely to be inundated with water at step S725 (YES at step S725), processor 230A transmits, to charging station 300A, a stop instruction for instructing charging station 300A to stop supply of power to vehicle 100B (step S740). Thereafter, if processor 230A receives a signal indicative of the control end from charging station 300A (YES at step S745), processor 230A proceeds to END.

In contrast, if processor 230A determines that vehicle 100B is not (less) likely to be inundated with water at step S725 (NO at step S725), processor 230A determines whether it is excessively raining in the region, based on the weather information acquired at step S715 (step S730). Specifically, if rainfall in the region acquired as the weather information is above a predetermined amount, processor 230A determines that it is excessively raining.

If processor 230A determines that it is excessively raining in the region at step S730 (YES at step S730), processor 230A returns to step S722. Due to this, processor 230A determines, again, whether vehicle 100B is likely to be inundated with water at step S725. If vehicle 100B is determined as likely to be inundated with water, the process is passed to step S740 and a power supply stop instruction is transmitted to charging station 300A.

If processor 230A determines that it is not excessively raining at step S730 (NO at step S730), processor 230A determines whether server 200A receives the control end from charging station 300A (step S735). If the receipt of the control end from charging station 300A is not acknowledged (NO at step S735), processor 230A returns to step S730. In contrast, if the receipt of the control end from charging station 300A is acknowledged (YES at step S735), processor 230A proceeds to END, which ends the series of processes.

While, in the above, the determination as to whether vehicle 100 is likely to be inundated with water is made (i) when the connector of the charging cable is connected to inlet 150 of vehicle 100 and server 200A receives the station information from charging station 300A, and (ii) when the rainfall in the region thereafter grows more intense (YES at step S730), it should be noted that the determination as to whether vehicle 100 is likely to be inundated with water may be made periodically, instead of the latter case.

As described above, in Embodiment 4, server 200A acquires the weather information and the flooding information, and determines whether vehicle 100B is likely to be inundated with water, and if vehicle 100B is determined as likely to be inundated with water, supply of power from charging station 300A to vehicle 100B is stopped. Consequently, according to Embodiment 4, there is no need to incorporate special features, related to the above, into vehicle 100B.

While in the above Embodiment 4, when the connector of the charging cable is connected to the inlet of vehicle 100B, the information about charging station 300A is transmitted to server 200A and server 200A determines whether vehicle 100B is likely to be inundated with water, it should be noted that charging station 300A may perform this determination process.

Moreover, while DC charging (the external charging) is performed by charging station 300 (300A) in the above embodiments, vehicle 100 (100A, 100B) according to the present disclosure may perform AC charging (the external charging) by an AC (alternate current) charging station. In this case, vehicle 100 (100A, 100B) includes a power conversion device for converting AC power, input through inlet 150, into DC power.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charge controller configured to control external charging in which a power storage device, included in a vehicle, is charged by a charging facility provided outside the vehicle, the charge controller comprising:
    an information acquisition device configured to acquire weather information related to rainfall in a region where the external charging is performed, and flooding information indicative of a prediction of flood damage in terms of a flooding level, which represents degree of risk of flooding, expected in each region where the charging facility is installed to charge the vehicle; and a control device configured to stop the external charging when it is determined, based on the weather information and the flooding information acquired by the information acquisition device, that the vehicle is likely to be inundated with water while the vehicle is stationary in the charging facility, wherein the control device is configured to determine that the vehicle is likely to be inundated with water when the flooding level indicates the prediction of flood damage is greater than or equal to a predetermined level.

2. The charge controller according to claim 1, wherein the vehicle is configured to perform the external charging from the charging facility through a charging cable, and
the control device is configured to determine, when the vehicle and the charging facility are connected to each other by the charging cable, whether the vehicle is likely to be inundated with water.

3. The charge controller according to claim 1, wherein the control device is configured to determine whether the vehicle is likely to be inundated with water when the weather information indicates rainfall greater than or equal to a predetermined amount.

4. The charge controller according to claim 1, wherein the control device is configured to determine that the vehicle is likely to be inundated with water when the weather information indicates rainfall greater than or equal to a predetermined amount and the flooding level indicates the prediction of flood damage greater than or equal to the predetermined level.

5. The charge controller according to claim 1, wherein in the event the vehicle is determined as likely to be inundated with water,
when the external charging is being performed, the control device halts the external charging; and when no external charging is being performed, the control device prohibits subsequent external charging.

6. The charge controller according to claim 1, wherein the weather information includes at least one of rainfall, special warning, river flooding information, and evacuation information.

7. The charge controller according to claim 1, wherein the flooding information includes a flooding hazard map indicating a risk of flooding for each region.

8. A charging system comprising:
a vehicle which includes a power storage device and is configured to perform external charging in which the power storage device is charged by a charging facility provided outside the vehicle, and
a server configured to communicate with the vehicle, the server being configured to:
  receive location information of the vehicle from the vehicle;
  acquire, based on the location information, weather information related to rainfall in a region where the external charging is performed, and flooding information indicative of a prediction of flood damage in terms of a flooding level, which represents degree of risk of flooding, expected in each region where the charging facility is installed to charge the vehicle;
  determine, based on the weather information and the flooding information, whether the vehicle is likely to be inundated with water while the vehicle is stationary in the charging facility, wherein the vehicle is likely to be inundated with water when the flooding level indicates that the prediction of flood damage is greater than or equal to a predetermined level; and
  transmit to the vehicle a stop instruction for stopping the external charging, when the vehicle is determined as likely to be inundated with water,
the vehicle being configured to stop the external charging when the vehicle receives the stop instruction from the server.

9. A charging system comprising:
a charging facility provided outside a vehicle and configured to supply power for charging a power storage device included in the vehicle; and
a server configured to communicate with the charging facility,
the server being configured to:
  acquire weather information and flooding information, based on location information of the charging facility, the weather information being related to rainfall in a region where the charging facility is installed, the flooding information indicating a prediction of flood damage in terms of a flooding level, which represents degree of risk of flooding, expected in each region where the charging facility is installed to charge the vehicle;
  determine, based on the weather information and the flooding information, whether the vehicle is likely to be inundated with water while the vehicle is stationary in the charging facility, wherein the vehicle is likely to be inundated with water when the flooding level indicates that the prediction of flood damage is greater than or equal to a predetermined level; and
  transmit to the charging facility a stop instruction for stopping supply of the power to the vehicle, when the vehicle is determined as likely to be inundated with water,
the charging facility being configured to stop the supply of the power to the vehicle, upon receipt of the stop instruction from the server.

10. A vehicle configured to perform external charging in which a power storage device, included in the vehicle, is charged by a charging facility provided outside the vehicle, the vehicle comprising:
a communication device configured to communicate with a server provided outside the vehicle; and
a control device configured to control the external charging,
the control device being configured to:
  acquire weather information and flooding information from the server, using the communication device, the weather information being related to rainfall in a region where the external charging is performed, the flooding information indicating a prediction of flood damage in terms of a flooding level, which represents degree of risk of flooding, expected in each region where the charging facility is installed to charge the vehicle;
  determine, based on the acquired weather information and the flooding information, whether the vehicle is likely to be inundated with water while the vehicle is stationary in the charging facility, wherein the vehicle is likely to be inundated with water when the flooding level indicates that the prediction of flood damage is greater than or equal to a predetermined level, and
  stop the external charging when the vehicle is determined as likely to be inundated with water.

11. A vehicle configured to perform external charging in which a power storage device, included in the vehicle, is charged by a charging facility provided outside the vehicle, the vehicle comprising:
- an atmospheric pressure sensor configured to measure atmospheric pressure around the vehicle;
- a storage device configured to store flooding information indicative of a prediction of flood damage in terms of a flooding level, which represents degree of risk of flooding, expected in each region where the charging facility is installed to charge the vehicle; and
- a control device configured to control the external charging,
- the control device being configured to:
  - forecast rain in a place where the external charging is performed, from a measurement by the atmospheric pressure sensor;
  - acquire the flooding information about the place where the external charging is performed, from the storage device;
  - determine, based on the forecast of rain and the acquired flooding information, whether the vehicle is likely to be inundated with water while the vehicle is stationary in the charging facility, wherein the vehicle is likely to be inundated with water when the flooding level indicates that the prediction of flood damage is greater than or equal to a predetermined level; and
  - stop the external charging when the vehicle is determined as likely to be inundated with water.

* * * * *